United States Patent
Nagata et al.

(10) Patent No.: US 11,710,407 B2
(45) Date of Patent: Jul. 25, 2023

(54) INFORMATION PROCESSING SYSTEM AND INFORMATION PROCESSING METHOD

(71) Applicant: PANASONIC INTELLECTUAL PROPERTY MANAGEMENT CO., LTD., Osaka (JP)

(72) Inventors: Keisuke Nagata, Osaka (JP); Takahiko Kamitsuji, Osaka (JP); Shigeki Matsunaga, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 562 days.

(21) Appl. No.: 16/894,122

(22) Filed: Jun. 5, 2020

(65) Prior Publication Data
US 2020/0302193 A1 Sep. 24, 2020

Related U.S. Application Data

(63) Continuation of application No. PCT/JP2019/037394, filed on Sep. 24, 2019.

(30) Foreign Application Priority Data

Sep. 28, 2018 (JP) .............................. JP2018-184123

(51) Int. Cl.
*G08G 1/16* (2006.01)
*B60W 30/09* (2012.01)
(Continued)

(52) U.S. Cl.
CPC ............. *G08G 1/164* (2013.01); *B60W 30/09* (2013.01); *B60W 30/0956* (2013.01);
(Continued)

(58) Field of Classification Search
CPC ............... B60W 30/09; B60W 30/095; B60W 30/0956; B60W 2556/45; B60W 2756/10; G08G 1/16; G08G 1/164
See application file for complete search history.

(56) References Cited

U.S. PATENT DOCUMENTS

2008/0288162 A1* 11/2008 Theimer ................ G08G 1/164
701/117
2011/0102195 A1* 5/2011 Kushi .............. G08G 1/096783
340/905
(Continued)

FOREIGN PATENT DOCUMENTS

JP  2006-298041    11/2006
JP  2006-350613    12/2006
(Continued)

OTHER PUBLICATIONS

Official Communication issued in International Patent Application No. PCT/JP2019/037394, dated Dec. 24, 2019, along with an English translation thereof.

*Primary Examiner* — Anshul Sood
(74) *Attorney, Agent, or Firm* — Greenblum & Bernstein, P.L.C.

(57) ABSTRACT

An information processing system, including: a surveillance camera that detects a plurality of obstacles in the vicinity of a specific vehicle; a first determiner that determines whether an unidentified obstacle, which is included in the plurality of obstacles and is not visible from the specific vehicle, is present based on first information regarding the plurality of obstacles detected by the surveillance camera and vehicle information indicating the specific vehicle; and a first communicator that outputs information indicating the unidentified obstacle to the specific vehicle when the first determiner determines that the unidentified obstacle is present.

14 Claims, 13 Drawing Sheets

(51) Int. Cl.
*B60W 30/095* (2012.01)
*G06V 20/58* (2022.01)
*G06F 18/2431* (2023.01)

(52) U.S. Cl.
CPC .......... *G06F 18/2431* (2023.01); *G06V 20/58* (2022.01); *G08G 1/16* (2013.01); *B60W 2420/42* (2013.01); *B60W 2520/10* (2013.01); *B60W 2520/12* (2013.01); *B60W 2554/20* (2020.02); *B60W 2554/4042* (2020.02); *B60W 2554/4043* (2020.02); *B60W 2554/4044* (2020.02); *B60W 2556/45* (2020.02)

(56) References Cited

U.S. PATENT DOCUMENTS

| | | | |
|---|---|---|---|
| 2012/0083959 A1 | 4/2012 | Dolgov et al. | |
| 2012/0083960 A1 | 4/2012 | Zhu et al. | |
| 2012/0083964 A1 | 4/2012 | Montemerlo et al. | |
| 2013/0253816 A1* | 9/2013 | Caminiti | G01S 19/00 701/301 |
| 2019/0096249 A1* | 3/2019 | Swan | B60T 7/12 |
| 2021/0001882 A1* | 1/2021 | Mortazavi | B60W 60/0011 |
| 2021/0300402 A1* | 9/2021 | Wendland | G08G 1/163 |

FOREIGN PATENT DOCUMENTS

| | | |
|---|---|---|
| JP | 2007-233864 | 9/2007 |
| JP | 2011-044085 | 3/2011 |
| JP | 2013-544696 | 12/2013 |
| JP | 2014-203349 | 10/2014 |
| WO | 2012/047977 | 4/2012 |

\* cited by examiner

INFORMATION PROCESSING SYSTEM AND INFORMATION PROCESSING METHOD

CROSS REFERENCE TO RELATED APPLICATION

This is a continuation application of PCT International Application No. PCT/JP2019/037394 filed on Sep. 24, 2019, designating the United States of America, which is based on and claims priority of Japanese Patent Application No. 2018-184123 filed on Sep. 28, 2018.

BACKGROUND

1. Technical Field

The present disclosure relates to an information processing system and an information processing method.

2. Description of the Related Art

Japanese Unexamined Patent Application Publication No. 2006-298041 (Patent Literature (PTL) 1) discloses a vehicle driving assistance system that includes: an imager that captures a dangerous area on a road vehicles drive and that is provided in such a place that image data of the dangerous area can be generated; and a notifier that issues an alarm based on an alarm signal.

SUMMARY

However, the driving assistance system according to the aforementioned PTL 1 can be improved upon.

In view of this, the present disclosure provides an information processing system and an information processing method capable of improving upon the above related art.

An information processing system according to one aspect of the present disclosure includes: a detector that detects a plurality of obstacles in a vicinity of a moving body; a first determiner that determines whether an unidentified obstacle is present based on first information regarding the plurality of obstacles detected by the detector and moving body information indicating the moving body, the unidentified obstacle being included in the plurality of obstacles and not visible from the moving body; and an output unit that outputs information indicating the unidentified obstacle to the moving body when the first determiner determines that the unidentified obstacle is present.

An information processing method according to one aspect of the present disclosure includes: detecting a plurality of obstacles in a vicinity of a moving body; determining whether an unidentified obstacle is present based on first information regarding the plurality of obstacles detected by the detector and moving body information indicating the moving body, the unidentified obstacle being included in the plurality of obstacles and not visible from the moving body; and outputting information indicating the unidentified obstacle to the moving body when it is determined that the unidentified obstacle is present.

General and specific aspects disclosed above may be implemented using a system, a method, an integrated circuit, a computer program, or a computer-readable recording medium such as a CD-ROM, or any combination thereof.

The information processing system and the information processing method according to the present disclosure are capable of further improving upon the related art.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

DETAILED DESCRIPTION OF THE EMBODIMENTS

Figure 1:
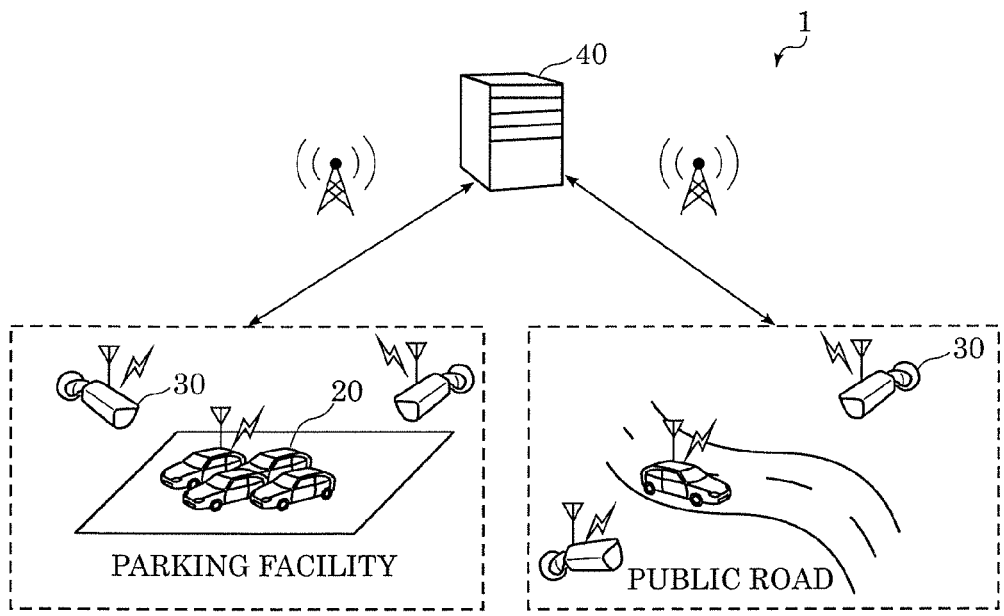
FIG. 1 is a schematic diagram illustrating an information processing system according to Embodiment 1.

With the conventional driving assistance system for capturing a dangerous area on a route a moving body drives, it is difficult to recognize, from the moving body, an obstacle such as a person and a vehicle hidden behind other obstacle. Therefore, when a moving body has a blind spot created by an obstacle, the moving body has to stop or reduce its speed for safety reasons when passing near the obstacle, and this causes an impedance to the normal driving of the moving body.

In view of this, an information processing system according to one aspect of the present disclosure includes: a detector that detects a plurality of obstacles in a vicinity of a moving body; a first determiner that determines whether an unidentified obstacle is present based on first information regarding the plurality of obstacles detected by the detector and moving body information indicating the moving body, the unidentified obstacle being included in the plurality of obstacles and not visible from the moving body; and an output unit that outputs information indicating the unidentified obstacle to the moving body when the first determiner determines that the unidentified obstacle is present.

The moving body is thus capable of obtaining information indicating at least one unidentified obstacle that is included in obstacles each being hidden behind other obstacle when viewed from the moving body and that is not visible from the moving body. The moving body is therefore capable of performing an operation based on the information indicating such unidentified obstacle.

Accordingly, the moving body is capable of moving appropriately even though there is a blind spot created by an obstacle in the traveling direction of the moving body. As a result, the information processing system can enhance safety while the moving body is moving.

When all of information on obstacles detected by the detector is transmitted to the moving body, for example, the amount of data for communications between the detector and the moving body increases. With the information processing system, however, the first determiner makes a determination on an unidentified obstacle and transmits information indicating the unidentified obstacle to the moving body, and this can reduce the amount of data for communications more than the case of transmitting all of information on obstacles detected by the detector.

An information processing method according to one aspect of the present disclosure includes: detecting a plurality of obstacles in a vicinity of a moving body; determining whether an unidentified obstacle is present based on first information regarding the plurality of obstacles detected by the detector and moving body information indicating the moving body, the unidentified obstacle being included in the plurality of obstacles and not visible from the moving body; and outputting information indicating the unidentified obstacle to the moving body when it is determined that the unidentified obstacle is present.

The information processing method also produces the same advantageous effects as those described above.

In the information processing system according to one aspect of the present disclosure, when (i) an obstacle other than the one or more first obstacles or (ii) an obstacle indicated by map information indicating a map of the vicinity of the moving body is present between the moving body and one of the one or more first obstacles, the first determiner determines that the first obstacle is the unidentified obstacle based on the moving body information, the first information, and the map information.

Thus, the first determiner is capable of easily making a determination on the presence of an unidentified obstacle based on the first information and the map information.

The information processing system according to one aspect of the present disclosure further includes a classifier that classifies each of one or more first obstacles among the plurality of obstacles according to a type of the first obstacle. When (i) an obstacle other than the one or more first obstacles among the plurality of obstacles indicated in the first information or (ii) an obstacle indicated by map information indicating a map of the vicinity of the moving body is present between the moving body and one of the one or more first obstacles, the first determiner determines that the first obstacle is the unidentified obstacle based on a type of the first obstacle, the type being one of types according to which the classifier has classified the one or more first obstacles.

Thus, the first determiner determines whether an unidentified obstacle is present according to the type of one of one or more first obstacles, which is one of types according to which the classifier has classified one or more first obstacles. This enables easy determination on the presence of an unidentified obstacle.

In the information processing system according to one aspect of the present disclosure, the moving body detects one or more second obstacles that are visible from the moving body, and transmits second information regarding the one or more second obstacles detected to the information processing system. When further determining that one of the one or more second obstacles indicated in the second information transmitted is identical to a corresponding one of one or more first obstacles among the plurality of obstacles indicated in the first information, the first determiner determines that the corresponding one of one or more first obstacles to which the one of the one or more second obstacles is determined to be identical is not the unidentified obstacle.

Since one or more second obstacles visible from the moving body are not defined as unidentified obstacles, information indicating at least one first obstacle remaining after one or more second obstacles have been excluded from one or more first obstacles is information indicating at least one unidentified obstacle. This enables the moving body to obtain information indicating at least one unidentified obstacle that has been more accurately determined as such. The moving body is therefore capable of moving smoothly based on the information indicating at least one unidentified obstacle.

Moreover, since the information indicating at least one unidentified obstacle excludes the second obstacles as not being unidentified obstacles, it is possible to reduce more the amount of data for communications between the detector and the moving body.

The information processing system according to one aspect of the present disclosure further includes a moving body controller that controls a movement of the moving body based on the information indicating the unidentified obstacle.

Since the moving body is controlled by the moving body controller based on the information indicating at least one unidentified obstacle, the moving body is capable of reducing its speed or stopping, or avoiding at least one unidentified obstacle.

In the information processing system according to one aspect of the present disclosure, the first information includes at least one of a moving speed, a moving direction, or a location of at least one of the plurality of obstacles detected by the detector.

Thus, the first determiner easily and more accurately determines whether an unidentified obstacle is present based on the first information.

The information processing system according to one aspect of the present disclosure further includes a route predictor that predicts a route of the unidentified obstacle based on the first information. The moving body controller controls the movement of the moving body based on the route predicted.

Thus, with the information processing system, it is possible to accurately predict a route of an unidentified obstacle. As a result, it is possible to enhance safety while the moving body is moving.

The information processing system according to one aspect of the present disclosure further includes a second determiner that determines a danger level of the unidentified obstacle based on the route of the unidentified obstacle or the first information, the route being predicted by the route predictor. The moving body controller controls the movement of the moving body based on information indicating the danger level determined by the second determiner.

Thus, with the information processing system, it is possible to accurately predict the danger level of an unidentified obstacle.

In the information processing system according to one aspect of the present disclosure, the moving body information includes at least one of a moving speed, a location, or a scheduled route of the moving body, and the second determiner determines the danger level of the unidentified obstacle based on a result obtained by determining whether the moving body comes in contact with the unidentified obstacle based on the first information and the moving body information.

The moving body thus obtains a danger level which is the result of a determination on whether the moving body comes in contact with an unidentified obstacle, and this enables the moving body to drive safely based on the danger level of the unidentified obstacle.

In the information processing system according to one aspect of the present disclosure, the second determiner: determines that the danger level is danger level one when a distance between the moving body and the unidentified obstacle is greater than or equal to a first specified distance and the moving body does not come in contact with the unidentified obstacle; determines that the danger level is danger level two higher than the danger level one when the distance between the moving body and the unidentified obstacle is less than the first specified distance and the moving body does not come in contact with the unidentified obstacle; determines that the danger level is danger level three higher than the danger level two when the distance between the moving body and the unidentified obstacle is greater than or equal to the first specified distance and there is a risk that the moving body comes in contact with the unidentified obstacle; and determines that the danger level is danger level four higher than the danger level three when the distance between the moving body and the unidentified obstacle is less than the first specified distance and there is a risk that the moving body comes in contact with the unidentified obstacle.

Thus, with the information processing system, it is possible to determine in stages the danger level of an unidentified obstacle depending on the conditions of the moving body and the unidentified obstacle. Therefore, accurately predicting the danger level of an unidentified obstacle enables the moving body to drive in accordance with the danger level of the unidentified obstacle. This enables the moving body to ensure safety.

The information processing system according to one aspect of the present disclosure further includes a classifier that classifies each of the one or more first obstacles among the plurality of obstacles as a moving obstacle that moves or a stationary obstacle that stays in a predetermined location. Based on the first information, the route predictor defines the moving obstacle as a classified unidentified obstacle and predicts a route of the classified unidentified obstacle.

Thus, with the information processing system, it is possible to classify each of one or more first obstacles indicated in the first information as a moving obstacle or a stationary obstacle. This enables accurate prediction of the route of an unidentified obstacle that has been classified. Moreover, it is possible to more correctly determine the danger level of the classified unidentified obstacle. Therefore, the moving body is capable of ensuring safety and moving smoothly by driving in accordance with the danger level.

The information processing system according to one aspect of the present disclosure further includes a danger notifier that at least notifies the unidentified obstacle that the moving body is approaching the unidentified obstacle or notifies the moving body that the unidentified obstacle is approaching the moving body.

This enables an unidentified obstacle and a moving vehicle to avoid a collision therebetween, and this in turn makes it possible to enhance safety for the unidentified obstacle and the moving vehicle.

The following describes exemplary embodiments with reference to the drawings. Note that the embodiments described below each show a specific embodiment of the present disclosure. The numerical values, shapes, materials, elements, the arrangement and connection of the elements, steps, order of the steps, etc. indicated in the following embodiments are mere examples, and therefore are not intended to limit the scope of the present disclosure. Moreover, among the elements in the following embodiments, those not recited in any one of the independent claims are described as optional elements.

The drawings are presented schematically and are not necessarily precise illustrations. In addition, substantially identical elements are assigned with like reference signs in the drawings and duplicate description is omitted or simplified.

The following describes the information processing system and the information processing method according to the exemplary embodiments of the present disclosure.

Embodiment 1

[Configuration]
[Information Processing System]

Information processing system 1 is a system for transmitting, to a moving body, information indicating conditions, such as moving speed, moving direction, location, size, etc. of an obstacle in a blind spot created by another obstacle on a route along which the moving body moves, and causing the moving body to recognize the conditions of the obstacle in the blind spot. The moving body is, for example, a vehicle, a robot vacuum cleaner, or an unmanned aerial vehicle. In this embodiment, a vehicle is used as an example of the moving body.

Figure 2:
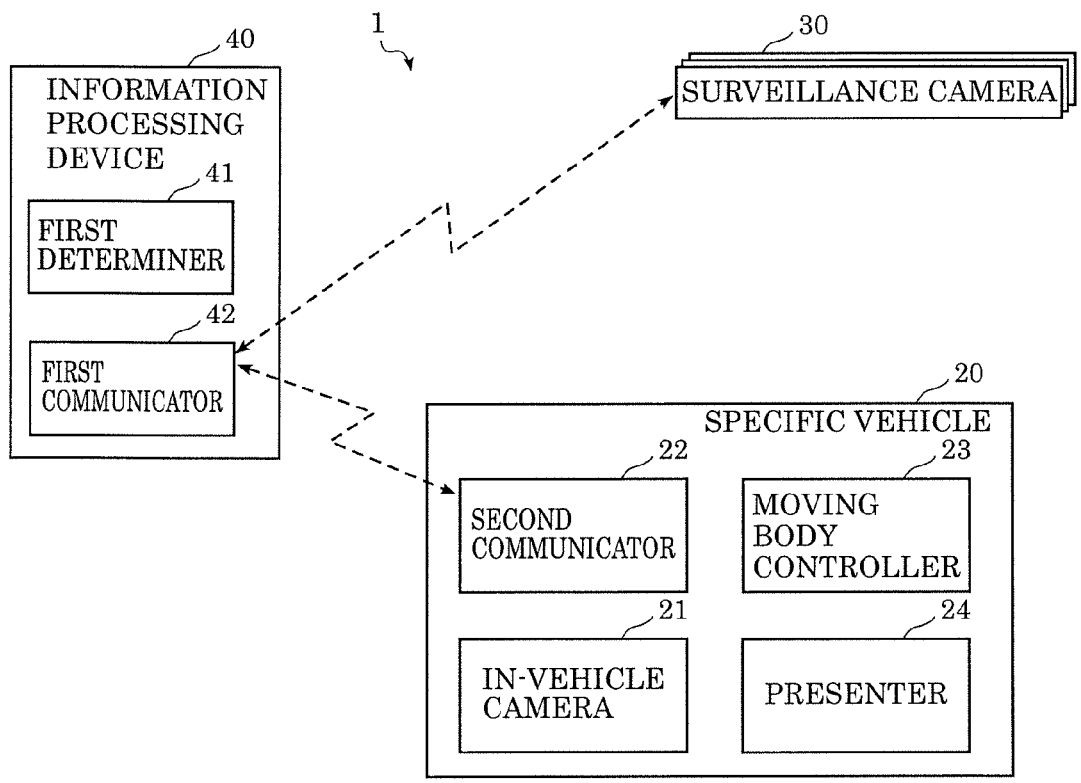
FIG. 2 is a block diagram illustrating the information processing system according to Embodiment 1.

FIG. 1 is a schematic diagram illustrating information processing system 1 according to Embodiment 1. FIG. 2 is a block diagram illustrating information processing system 1 according to Embodiment 1.

Information processing system 1 includes surveillance cameras 30, specific vehicle 20, and information processing device 40, as illustrated in FIG. 1 and FIG. 2.

[Surveillance Camera]

In this embodiment, each of surveillance cameras 30 is installed in various places so that, for example, the whole area of a parking facility or public roads can be captured. Each surveillance camera 30 records a video (wide-angle shooting) of all of moving bodies including vehicles and obstacles other than the moving bodies in the parking facility, and performs tracing and monitoring. The obstacles here include an obstacle that is moving, such as a person or a vehicle (hereinafter referred to as a moving obstacle), and an obstacle that settles on the ground, such as a building structure, a tree, or an obstacle that stays in a predetermined location (hereinafter referred to as a stationary obstacle).

In this embodiment, surveillance camera 30 (infrastructure camera) is used for an example of a detector, but the detector may be a satellite camera, an aerial photography camera or in-vehicle camera 21 mounted on another vehicle. Surveillance camera 30 may be a time of flight (TOF) camera or a human-presence sensor.

Surveillance camera 30 captures an image of (detects) a vehicle and first obstacles in the vicinity of the vehicle. Surveillance camera 30 then generates, based on the captured image, first information indicating the first obstacles included in the captured image as well as the moving speed, moving direction, location, size, etc. of each of the first obstacles. The first obstacles are each an obstacle captured by surveillance camera 30, and is, for example, a person, a vehicle, a flying object, or a building structure, as already described above. The first information may include at least one of moving speed, moving direction, and location of an obstacle, and indicates one or more first obstacles.

Surveillance camera 30 also captures a vehicle to be monitored (referred to as specific vehicle 20) other than the first obstacles included in the captured image. Although the present embodiment illustrates one specific vehicle 20 as an example, one surveillance camera 30 may generate vehicle information (to be described later) indicating each of specific vehicles 20.

Surveillance camera 30 is communicably connected to information processing device 40. Surveillance camera 30 transmits the first information to information processing device 40.

[Specific Vehicle]

Specific vehicle 20 is a vehicle to be monitored by surveillance camera 30, is a vehicle operated either by manual or autonomous driving, and is communicably connected to information processing device 40.

Specific vehicle 20 includes in-vehicle camera 21, second communicator 22, moving body controller 23, and presenter 24, as illustrated in FIG. 2.

In-vehicle camera 21 detects (captures an image of) second obstacles in the vicinity of specific vehicle 20. The second obstacles are each an obstacle captured by in-vehicle camera 21 and is, for example, a person, a vehicle, or a building structure, as already described above. In this embodiment, in-vehicle camera 21 captures an area in the traveling direction of specific vehicle 20. In-vehicle camera 21 generates, based on the captured image, second information indicating the second obstacles included in the captured image as well as the moving speed, moving direction, location, size, etc. of each of the second obstacles. In-vehicle camera 21 then transmits the second information to information processing device 40 via second communicator 22. The second information is information indicating one or more second obstacles. In-vehicle camera 21 is one example of a detector.

Second communicator 22 is a wireless module such as an antenna and is capable of communicating with information processing device 40. Second communicator 22 transmits information indicating at least one image captured by in-vehicle camera 21 and vehicle information or receives information indicating at least one unidentified obstacle, which is to be described later, from information processing device 40.

The vehicle information is information for specifying a vehicle to be monitored among one or more vehicles captured by surveillance camera 30, and includes the moving speed and location of specific vehicle 20, a route scheduled for specific vehicle 20 to drive (hereinafter referred to as a scheduled route). Specific vehicle 20 to be monitored is, for example, a vehicle that is driving or is going to drive. The vehicle information is one example of moving body information.

Upon obtaining information indicating at least one unidentified obstacle via second communicator 22, moving body controller 23 controls the driving of specific vehicle 20 based on information indicating at least one image captured by in-vehicle camera 21 and the information indicating at least one unidentified obstacle. Moving body controller 23 causes specific vehicle 20 to drive along a scheduled route of specific vehicle 20 which has been generated by a route setting unit not shown in the diagram. Moving body controller 23 transmits a command to control the driving of specific vehicle 20 to, for example, an engine control unit (ECU) and/or a steering actuator. When it is determined that specific vehicle 20 is in danger based on the information indicating at least one unidentified obstacle, moving body controller 23 transmits a command for controlling the headlights and horn of specific vehicle 20, and notifies at least one unidentified obstacle of the presence of specific vehicle 20 by light and sound.

A scheduled route is a route from a present location to a destination, which is scheduled for specific vehicle 20 to drive and is determined, for example, by a destination that has been input by a user of information processing device 40. Information indicating a scheduled route may be obtained from an external device. The route setting unit may be provided in specific vehicle 20 or information processing device 40, or may be a device independent from specific vehicle 20 or information processing device 40.

Presenter 24 is, for example, a car navigation system or a loudspeaker and outputs information indicating at least one unidentified obstacle. Presenter 24 may present, for example, the moving speed, moving direction, location, size, etc. of an unidentified obstacle. In other words, presenter 24 may inform one or more persons boarding specific vehicle 20 of such information.

[Information Processing Device]

Figure 3:
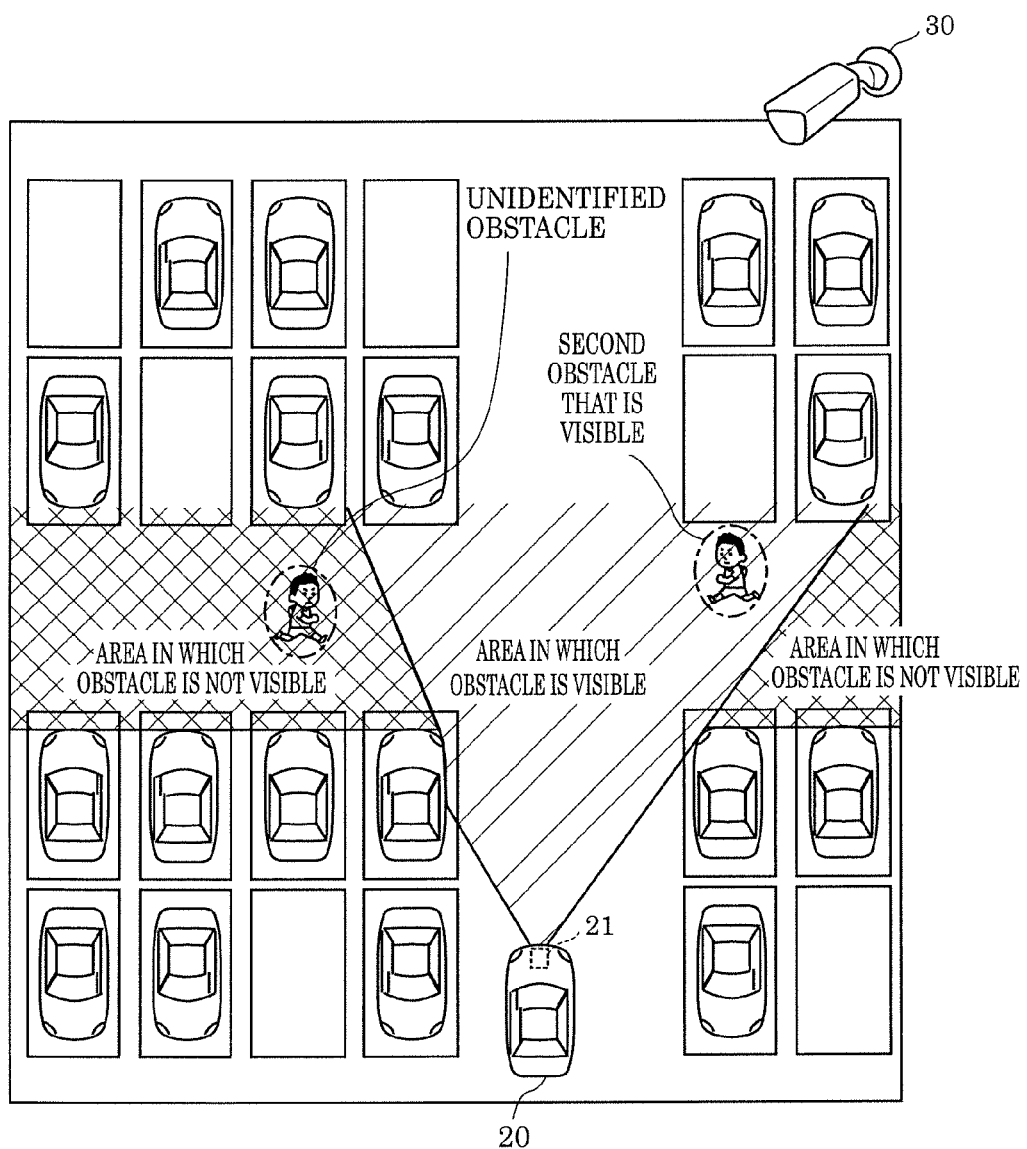
FIG. 3 is a schematic illustration illustrating a relationship between a specific vehicle and an unidentified obstacle in the information processing system according to Embodiment 1.

Information processing device 40 is a device that transmits, to specific vehicle 20, information indicating at least one unidentified obstacle that is not visible from specific vehicle 20, as illustrated in FIG. 2 or FIG. 3. Information processing device 40 is, for example, a server device such as a personal computer. At least one unidentified obstacle here is an obstacle that is not visible from specific vehicle 20 and is at least one obstacle remaining after obstacles, which are captured by in-vehicle camera 21 and are each identical to a corresponding one of obstacles captured by surveillance camera 30, have been excluded from the obstacles captured by surveillance camera 30. An unidentified obstacle is, for example, a moving obstacle such as a person or a vehicle.

Information processing device 40 includes first determiner 41 and first communicator 42.

First determiner 41 determines whether an unidentified obstacle, which is an obstacle included in a plurality of obstacles that are not visible from specific vehicle 20 among obstacles each being hidden behind other obstacle, is present based on the obtained first information and vehicle information, and map information indicating a map of the vicinity of specific vehicle 20. FIG. 3 is a schematic illustration illustrating a relationship between specific vehicle 20 and an unidentified obstacle in information processing system 1 according to Embodiment 1. An unidentified obstacle includes not only an obstacle that is not visible from specific vehicle 20, but also an obstacle that is difficult to see, that is, an obstacle that is not at all visible from specific vehicle 20.

For example, first determiner 41 extracts one or more first obstacles from among obstacles in the vicinity of specific vehicle 20 based on the first information and the vehicle information. First determiner 41 determines, for each of one or more first obstacles, whether an obstacle other than one or more first obstacles indicated in the first information or an obstacle indicated in the map information (hereinafter referred to as other obstacle indicated by first information or map information) is present between specific vehicle 20 and the first obstacle. When other obstacle indicated in the first information or the map information is present between specific vehicle 20 and the first obstacle, that first obstacle can be a candidate for an unidentified obstacle. One or more first obstacles are roughly categorized into moving obstacles and stationary obstacles.

The map information here indicates a map of the vicinity of specific vehicle 20 and includes, for example, an internal structure (floor map) of a parking facility, for example.

Subsequently, when determining that one of the second obstacles indicated by second information received from specific vehicle 20 is identical to a corresponding one of the first obstacles, first determiner 41 determines that the corresponding first obstacle is not an unidentified obstacle. Since the first obstacles may be visible from specific vehicle 20, obstacles (second obstacles) visible from specific vehicle 20 should be excluded from the first obstacles and at least one first obstacle remaining after the exclusion should be determined as an unidentified obstacle. First determiner 41 therefore does not determine, as an unidentified obstacle, one of one or more first obstacles among the plurality of obstacles indicated in the first information, which is an obstacle identical to (e.g., an obstacle that is co-located or can be regarded as co-located with) a corresponding one of the second obstacles indicated in the second information. First determiner 41 thus determines an obstacle hidden behind other obstacle as an unidentified obstacle. An unidentified obstacle is either a moving obstacle or a stationary obstacle, but may be limited to a moving obstacle.

The determination that a second obstacle is identical to a corresponding first obstacle may be made not only in the case where the second obstacle is completely identical to the corresponding first obstacle, but also in the case where the second obstacle is substantially identical to the corresponding first obstacle.

First determiner 41 may determine whether an unidentified obstacle that is not visible from specific vehicle 20 is present by also taking the following into consideration: the sizes and heights of the obstacles indicated in the first information; and the conditions of the ground, e.g., whether the ground is uneven, indicated in the map information.

The map information may be pre-stored in a recording medium included in information processing device 40 or may be obtained from, for instance, other server device via a network.

When determining that at least one unidentified obstacle is present, first determiner 41 transmits information indicating at least one unidentified obstacle via first communicator 42, as illustrated in FIG. 1 or FIG. 2. The information indicating at least one unidentified obstacle includes the moving speed, moving direction, location, size, etc. of at least one unidentified obstacle.

First communicator 42 is a communication module such as an antenna and is capable of communicating with specific vehicle 20 and surveillance camera 30. First communicator 42 receives the first information from surveillance camera 30 and outputs the first information to first determiner 41. First communicator 42 also transmits information indicating at least one unidentified obstacle to specific vehicle 20. First communicator 42 is one example of an output unit. The output unit may be a communication interface or a communication module such as an antenna.

[Operation]

The following describes an operation of information processing system 1 for implementing an information processing method according to this embodiment.

Figure 4:
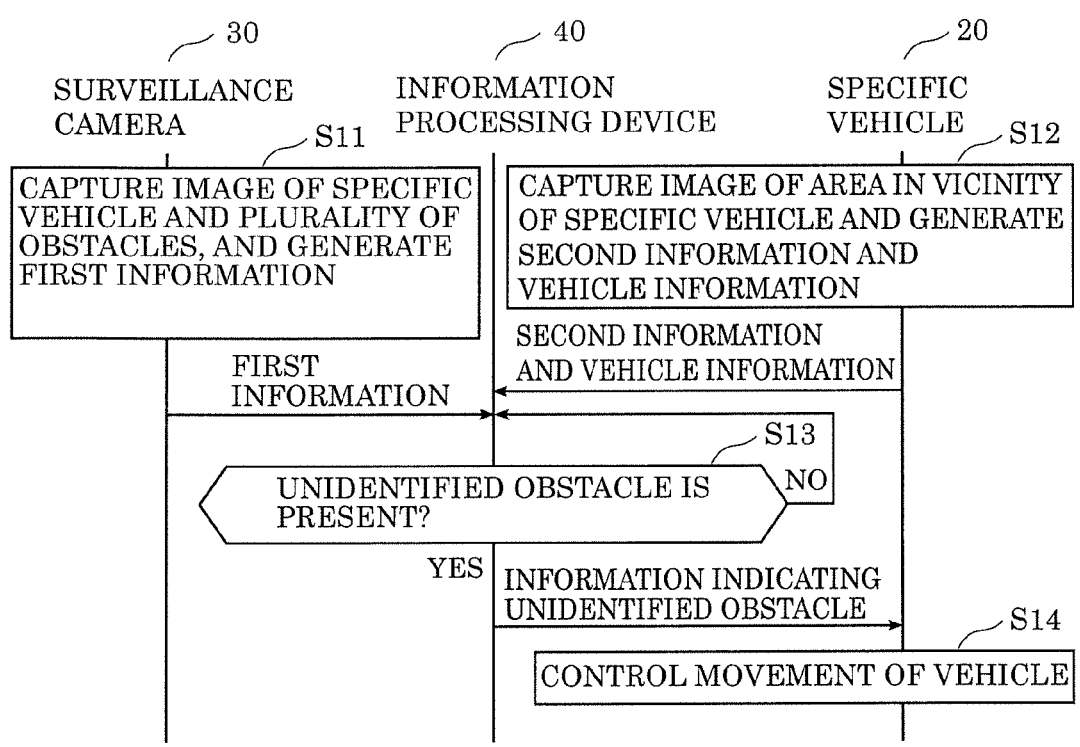
FIG. 4 is a sequence diagram illustrating an operation of the information processing system according to Embodiment 1.

FIG. 4 is a sequence diagram illustrating the operation of information processing system 1 according to Embodiment 1.

First, surveillance camera 30 captures an image of specific vehicle 20 and a plurality of obstacles in the vicinity of specific vehicle 20, as illustrated in FIG. 4. Based on the captured image, surveillance camera 30 also extracts first obstacles included in the captured image and generates first information indicating the moving speed, moving direction, location, size, etc. of each of the first obstacles (S11). Surveillance camera 30 transmits the first information to information processing device 40.

In-vehicle camera 21 in specific vehicle 20 captures an image of an area in the vicinity of specific vehicle 20, and mainly an area in the traveling direction of specific vehicle 20 (S12). Based on the captured image, in-vehicle camera 21 extracts second obstacles included in the captured image and generates second information indicating the moving speed, moving direction, location, size, etc. of each of the second obstacles. Specific vehicle 20 generates vehicle information including moving speed, location, scheduled route, etc. of specific vehicle 20. Specific vehicle 20 transmits the second information and vehicle information to information processing device 40 via second communicator 22.

Information processing device 40 determines whether an unidentified obstacle, which is included in obstacles each being hidden behind other obstacle when viewed from specific vehicle 20 and is not visible from specific vehicle 20, is present based on the first information, the vehicle information, and map information. Specifically, first determiner 41 in information processing device 40 specifies one or more moving obstacles (one example of the first obstacles) among obstacles in the vicinity of specific vehicle 20, based on the first information and the vehicle information. First determiner 41 determines, for each of one or more moving obstacles, whether other obstacle indicated in the first information or the map information is present between specific vehicle 20 and the moving obstacle. When such other obstacle is present between specific vehicle 20 and the moving obstacle, first determiner 41 further determines, for each of the second obstacles indicated in the second information received from specific vehicle 20, whether the second obstacle is identical to a corresponding one of one or more moving obstacles. When determining that the second obstacle is identical to the corresponding one of one or more moving obstacles, first determiner 41 determines that the second obstacle is not an unidentified obstacle. Stated differently, first determiner 41 does not determine, as an unidentified obstacle, a moving obstacle that is indicated in the first information and is identical to a corresponding one of the second obstacles indicated in the second information. First determiner 41 thus determines, as an unidentified obstacle, at least one first obstacle (moving obstacle) remaining after the second obstacles have been excluded from the first obstacles, and determines that at least one unidentified obstacle is present (S13). When Yes at step S13, first determiner 41 transmits information indicating at least one unidentified obstacle to specific vehicle 20.

In contrast, when other obstacle indicated in the first information or the map information is not present between the moving obstacle and specific vehicle 20 (No in S13), it is a state in which that moving obstacle is visible from specific vehicle 20, that is, a state in which no unidentified obstacle is present. Therefore, when No at step S13, first determiner 41 returns to step S13 and waits until another first information and vehicle information are received.

Upon obtaining the information indicating at least one unidentified obstacle, moving body controller 23 in specific vehicle 20 controls the driving of specific vehicle 20 based on the information indicating at least one unidentified obstacle (S14). More specifically, moving body controller 23 controls the steering actuator, brakes, accelerator, headlights, horn, etc. of specific vehicle 20 based on the moving speed, moving direction, location, and size of at least one unidentified obstacle.

For example, when it is determined that there is a risk that specific vehicle 20 comes in contact with the unidentified obstacle (determined that specific vehicle 20 is in danger), that is, when it is determined that specific vehicle 20 comes in contact with the unidentified obstacle based on the moving direction and speed of the unidentified obstacle and the vehicle information of specific vehicle 20, moving body controller 23 controls the brakes and accelerator of specific vehicle 20 and causes specific vehicle 20 to stop or reduce its speed. Whether specific vehicle 20 comes in contact with the unidentified obstacle is derived from the moving direction and speed of the unidentified obstacle and the vehicle information of specific vehicle 20.

When it is determined that there is a risk of close contact or contact between specific vehicle 20 and the unidentified obstacle (determined that specific vehicle 20 is in danger) based on the information indicating the unidentified obstacle, moving body controller 23 controls the headlights, horn, etc. of specific vehicle 20 and notifies the unidentified obstacle of the presence of specific vehicle 20 by light and sound. Moving body controller 23 may change a scheduled route of specific vehicle 20 to control the steering actuator, brakes, and accelerator of specific vehicle 20 along the changed scheduled route.

Advantageous Effects, Etc.

The following describes the advantageous effects of information processing system 1 and the information processing method according to the present embodiment.

As described above, in information processing system 1 and the information processing method, first determiner 41 determines whether an unidentified obstacle, which is included in a plurality of obstacles detected by surveillance camera 30 and is not visible from specific vehicle 20 among obstacles each being hidden behind other obstacle when viewed from specific vehicle 20, is present based on the first information regarding the plurality of obstacles detected by surveillance camera 30 and the map information indicating a map of the vicinity of specific vehicle 20. When first determiner 41 determines that at least one unidentified obstacle is present, first communicator 42 outputs information indicating at least one unidentified obstacle to specific vehicle 20. This enables specific vehicle 20 to obtain the information indicating at least one unidentified obstacle that is not visible from specific vehicle 20 among obstacles each being hidden behind other obstacle when viewed from specific vehicle 20. Specific vehicle 20 is thus capable of performing an operation based on the information indicating at least one unidentified obstacle.

Accordingly, specific vehicle 20 is capable of moving appropriately when there is a blind spot created by an obstacle in the traveling direction of specific vehicle 20. As a result, information processing system 1 can enhance safety while specific vehicle 20 is moving.

When all of information on a plurality of obstacles detected by surveillance camera 30 is transmitted to specific vehicle 20, for example, the amount of data communications between surveillance camera 30 and specific vehicle 20 increases. With information processing system 1, however, first determiner 41 makes a determination on at least one unidentified obstacle and transmits information indicating at least one unidentified obstacle to specific vehicle 20, and this can reduce the amount of data for communications more than the case of transmitting information on all of obstacles detected by the detector.

Embodiment 2

[Configuration]

Some of the elements according to this embodiment are identical to those illustrated in Embodiment 1 unless stated otherwise, and the identical elements are assigned with like reference signs and the detailed description related to the elements is omitted.

Figure 5:
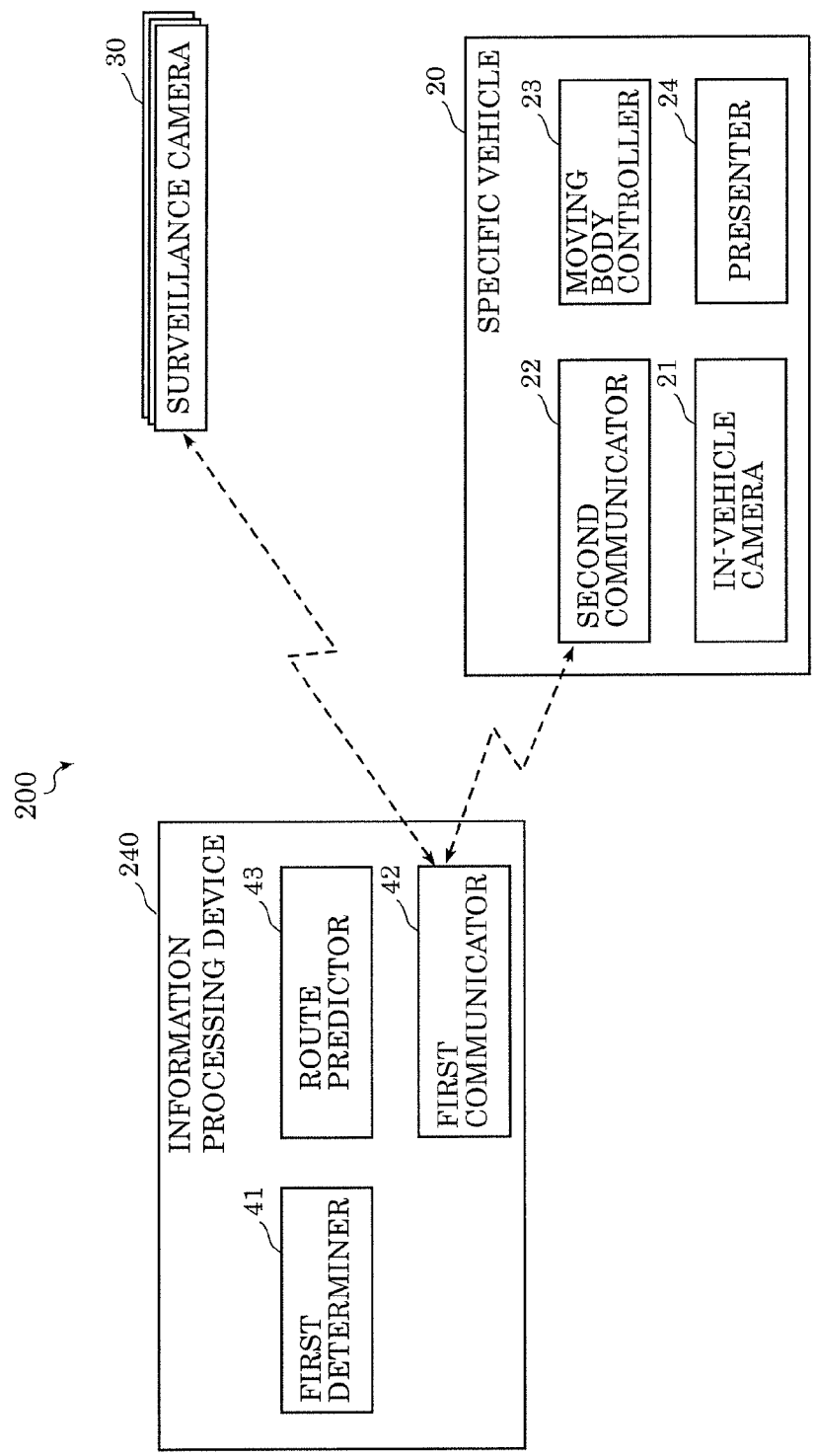
FIG. 5 is a block diagram illustrating an information processing system according to Embodiment 2.

FIG. 5 is a block diagram illustrating information processing system 200 according to Embodiment 2.

Information processing device 240 further includes route predictor 43, as illustrated in FIG. 5.

Route predictor 43 predicts a route of an unidentified obstacle based on first information. Specifically, route predictor 43 obtains first information from surveillance camera 30 via first communicator 42. Route predictor 43 predicts a route of an unidentified obstacle from the moving speed, moving direction, location, size, etc. of each of the first obstacles indicated in the first information.

When an unidentified obstacle that drives a road is present and the unidentified obstacle is driving on a right turn lane, for example, route predictor 43 may predict that the unidentified obstacle turns right. In another example, when a guardrail is present between specific vehicle 20 and an unidentified obstacle, route predictor 43 may predict the route of the unidentified obstacle under the prediction that it is unlikely that the unidentified obstacle drives over the guardrail to come in close contact with specific vehicle 20.

Route predictor 43 transmits information indicating the predicted route of the unidentified obstacle to specific vehicle 20 via first communicator 42. Presenter 24 outputs the information indicating the predicted route of the unidentified obstacle and information indicating the unidentified obstacle.

Upon obtaining the information indicating the predicted route of the unidentified obstacle, moving body controller 23 in specific vehicle 20 controls the driving of specific vehicle 20. Specifically, when it is determined that there is a risk that specific vehicle 20 comes in contact with the unidentified obstacle, based on the information indicating the predicted route of the unidentified obstacle and the vehicle information of specific vehicle 20, that is, when it is determined that there is a risk of close contact or contact between specific vehicle 20 and the unidentified obstacle (determined that specific vehicle 20 is in danger), moving body controller 23 controls the brakes and accelerator of specific vehicle 20 and causes specific vehicle 20 to stop or reduce its speed.

[Operation]

The following describes an operation of information processing system 200 for implementing an information processing method according to this embodiment.

Figure 6:
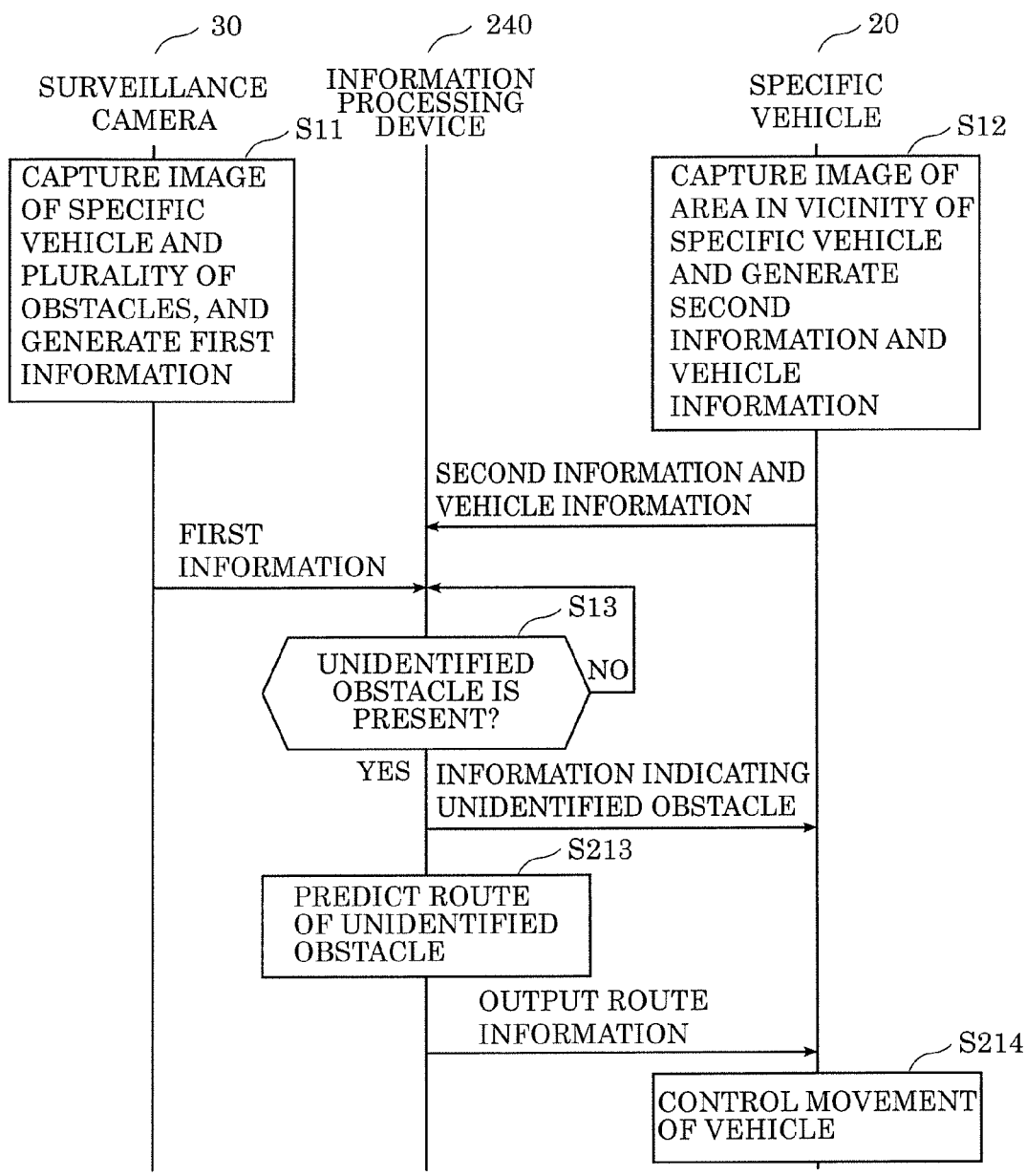
FIG. 6 is a sequence diagram illustrating an operation of the information processing system according to Embodiment 2.

FIG. 6 is a sequence diagram illustrating the operation of information processing system 200 according to Embodiment 2.

Regarding the operation of information processing system 200 for implementing the information processing method according to this embodiment, the description of an operation that is identical to that illustrated in FIG. 4 is omitted accordingly.

First, surveillance camera 30 captures an image of specific vehicle 20 and a plurality of obstacles in the vicinity of specific vehicle 20, and generates first information (S11), as illustrated in FIG. 6. Surveillance camera 30 transmits the first information to information processing device 240.

In-vehicle camera 21 in specific vehicle 20 captures an image of an area in the vicinity of specific vehicle 20 (S12). Specific vehicle 20 transmits the second information and the vehicle information to information processing device 240.

First determiner 41 in information processing device 240 determines whether an unidentified obstacle, which is not visible from specific vehicle 20 among obstacles each being hidden behind other obstacle when viewed from specific vehicle 20, based on the first information, the vehicle information, and map information (S13). When Yes at step S13, first determiner 41 transmits information indicating the unidentified obstacle to specific vehicle 20 and proceeds to step S213. When No at step S13, first determiner 41 returns to step S13 and waits until another first information and vehicle information are received.

Route predictor 43 in information processing device 240 predicts a route of the unidentified obstacle based on the first information. Specifically, route predictor 43 predicts a route of the unidentified obstacle from the moving speed, moving direction, location, size, etc. of each of the obstacles that are detected by surveillance camera 30 and are indicated in the first information (S213). The predicted route of the unidentified obstacle may simply be a route that continues in the traveling direction of the unidentified obstacle. Route predictor 43 transmits information indicating the predicted route of the unidentified obstacle to specific vehicle 20 via first communicator 42.

Moving body controller 23 in specific vehicle 20 obtains information indicating the unidentified obstacle and the information indicating the predicted route of the unidentified obstacle, and controls the driving of specific vehicle 20 based on such information (S214). Specifically, moving body controller 23 controls the steering actuator, brakes, accelerator, headlights, horn, etc. of specific vehicle 20 based on the moving speed, moving direction, location, and size of the unidentified obstacle.

Advantageous Effects Etc.

The following describes the advantageous effects of information processing system 200 and the information processing method according to the present embodiment.

As described above, route predictor 43 predicts a route of an unidentified obstacle based on first information including the moving speed, moving direction, location, and size of each of first obstacles included in an image captured by surveillance camera 30. Therefore, it is possible, with information processing system 200, to accurately predict the route of an unidentified obstacle. As a result, it is possible to enhance safety while specific vehicle 20 is moving.

Other advantageous effects produced by the information processing system and the information processing method according to the present embodiment are identical to those achieved by the information processing system and the information processing method according to Embodiment 1.

Embodiment 3

[Configuration]

Some of the elements according to this embodiment are identical to those illustrated in Embodiment 1 or 2 unless stated otherwise, and the identical elements are assigned with like reference signs and the detailed description related to the elements is omitted.

Figure 7:
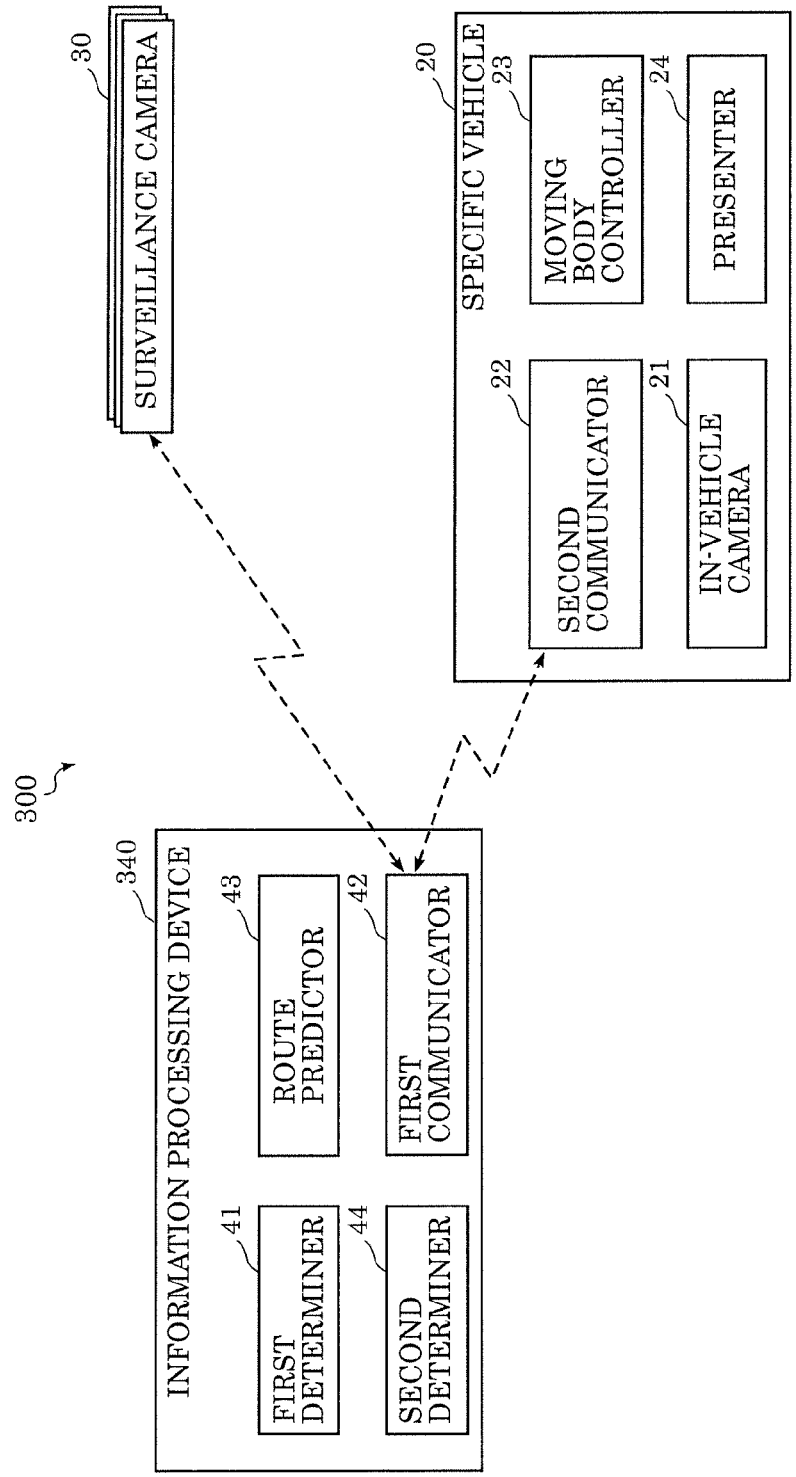
FIG. 7 is a block diagram illustrating an information processing system according to Embodiment 3.

FIG. 7 is a block diagram illustrating information processing system 300 according to Embodiment 3.

Information processing device 340 further includes second determiner 44, as illustrated in FIG. 7.

Second determiner 44 determines the danger level of an unidentified obstacle based on the first information or the route, which has been predicted by route predictor 43, of the unidentified obstacle. Specifically, second determiner 44 determines the danger level of the unidentified obstacle based on a result obtained by determining whether specific vehicle 20 comes in contact with the unidentified obstacle based on the first information and the vehicle information. Route predictor 43 predicts a route of an unidentified obstacle from the moving speed, moving direction, location, size, etc. of each of the first obstacles indicated in the first information. Second determiner 44 determines whether specific vehicle 20 comes in contact with the unidentified obstacle based on the route of the unidentified obstacle, which has been predicted by route predictor 43, the moving speed, location, and the scheduled route of specific vehicle 20 which are indicated in the vehicle information. Second determiner 44 determines in stages the danger level of the unidentified obstacle based on whether specific vehicle 20 comes in contact with the unidentified obstacle.

More specifically, when a distance between specific vehicle 20 and the unidentified obstacle is greater than or equal to a first specified distance and specific vehicle 20 does not come in contact with the unidentified obstacle, second determiner 44 determines that the danger level is danger level one. The danger level one indicates a case where the danger level is low. Even when other obstacle is present in the vicinity of specific vehicle 20, for example, the risk of contact is low if this obstacle is visible from specific vehicle 20. The danger level is low also in the case where the unidentified obstacle is present but is located at a long distance from specific vehicle 20.

When the distance between specific vehicle 20 and the unidentified obstacle is less than the first specified distance and specific vehicle 20 does not come in contact with the unidentified obstacle, second determiner 44 determines that the danger level is danger level two higher than the danger level one. The danger level two indicates a case where the danger level is low. Even when the unidentified obstacle is located within a short distance from specific vehicle 20, for example, the danger level is low if there is no risk that specific vehicle 20 comes in contact with the unidentified obstacle.

When the distance between specific vehicle 20 and the unidentified obstacle is greater than or equal to the first specified distance and there is a risk that specific vehicle 20 comes in contact with the unidentified obstacle, second determiner 44 determines that the danger level is danger level three higher than the danger level two. The danger level three indicates a case where the danger level is middle. Even when the unidentified obstacle is located at a long distance from specific vehicle 20, for example, the danger level is middle if there is a risk that specific vehicle 20 comes in contact with the unidentified obstacle.

When the distance between specific vehicle 20 and the unidentified obstacle is less than the first specified distance and there is a risk that specific vehicle 20 comes in contact with the unidentified obstacle, second determiner 44 determines that the danger level is danger level four higher than the danger level three. The danger level four indicates a case where the danger level is high. When the unidentified obstacle is located within a short distance from specific vehicle 20 and there is a risk that specific vehicle 20 comes in contact with the unidentified obstacle, for example, the danger level is high.

First communicator 42 outputs information indicating any one of the danger levels determined by second determiner 44 to moving body controller 23.

Presenter 24 outputs information indicating the unidentified obstacle, information indicating the predicted route of the unidentified obstacle, and the information indicating the danger level of the unidentified obstacle.

[Operation]

The following describes an operation of information processing system 300 for implementing an information processing method according to this embodiment.

Figure 8:
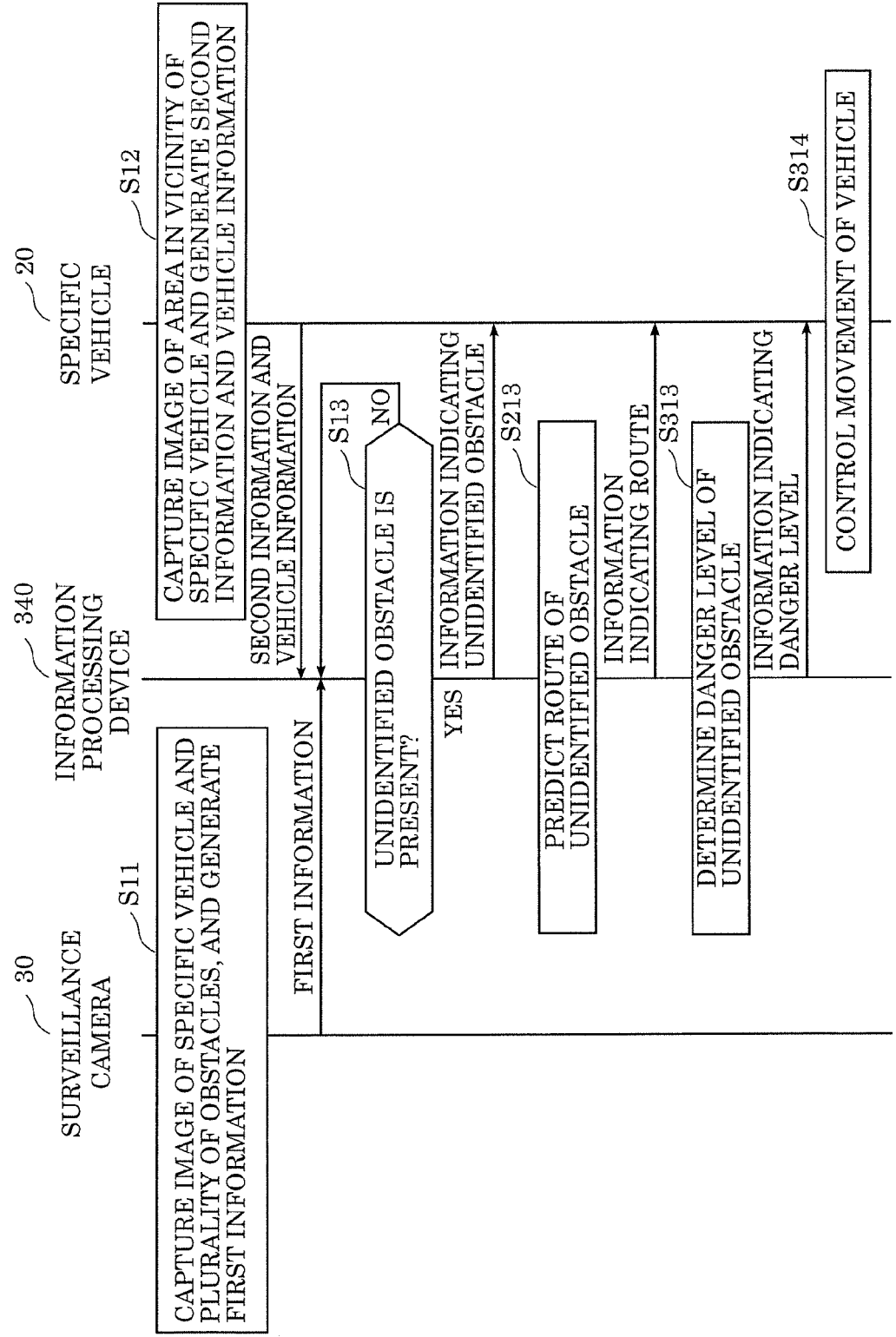
FIG. 8 is a sequence diagram illustrating an operation of the information processing system according to Embodiment 3.

FIG. 8 is a sequence diagram illustrating the operation of information processing system 300 according to Embodiment 3.

Regarding the operation of information processing system 300 for implementing the information processing method according to this embodiment, the description of an operation that is identical to that illustrated in FIG. 4 is omitted accordingly.

First, surveillance camera 30 captures an image of specific vehicle 20 and a plurality of obstacles in the vicinity of specific vehicle 20, and generates first information (S11), as illustrated in FIG. 8. Surveillance camera 30 transmits the first information to information processing device 340.

In-vehicle camera 21 in specific vehicle 20 captures an image of an area in the vicinity of specific vehicle 20 (S12). Specific vehicle 20 transmits the second information and the vehicle information to information processing device 340.

Information processing device 340 determines whether an unidentified obstacle, which is not visible from specific vehicle 20 among obstacles each being hidden behind other obstacle when viewed from specific vehicle 20, is present based on the first information, the vehicle information, and map information (S13). When Yes at step S13, first determiner 41 transmits information indicating the unidentified obstacle to specific vehicle 20 and proceeds to step S213. When No at step S13, first determiner 41 returns to step S13 and waits until another first information and vehicle information are received.

Route predictor 43 in information processing device 340 predicts a route of the unidentified obstacle based on the first information (S213). Route predictor 43 transmits information indicating the predicted route of the unidentified obstacle to specific vehicle 20.

Second determiner 44 in information processing device 340 determines the danger level of the unidentified obstacle based on the route of the unidentified obstacle, which has been predicted by route predictor 43 (S313). In this embodiment, second determiner 44 determines the danger level of the unidentified obstacle to be any of the danger levels one through four. Second determiner 44 outputs information indicating the determined danger level of the unidentified obstacle to moving body controller 23. The determination on the danger level of the unidentified obstacle will be described later.

Moving body controller 23 in specific vehicle 20 obtains the information indicating the unidentified obstacle, the information indicating the predicted route of the unidentified obstacle, and the information indicating the danger level of the unidentified obstacle, and controls the driving of specific vehicle 20 based on such information (S314). Specifically, moving body controller 23 controls the steering actuator, brakes, accelerator, headlights, horn, etc. of specific vehicle 20 based on the moving speed, moving direction, location, and size of the unidentified obstacle, and the information indicating the danger level of the unidentified obstacle.

More specifically, when the danger level of the unidentified obstacle is the danger level one or two, moving body controller 23 controls headlights, horn, etc. of specific vehicle 20 to notify the unidentified obstacle of the presence of specific vehicle 20. When the danger level of the unidentified obstacle is the danger level three, moving body controller 23 controls the brakes, accelerator, etc. of specific vehicle 20 to cause specific vehicle 20 to reduce its speed or controls the headlights, horn, etc. of specific vehicle 20 to notify the unidentified obstacle of the presence of specific vehicle 20. When the danger level of the unidentified obstacle is the danger level four, moving body controller 23 controls the brakes, accelerator, etc. of specific vehicle 20 to cause specific vehicle 20 to reduce its speed or stop, or controls, in combination with the control on the brakes and accelerator, the headlights, horn, etc. of specific vehicle 20 to notify the unidentified obstacle of the presence of specific vehicle 20.

Since moving body controller 23 causes specific vehicle 20 to divert so as to avoid the unidentified obstacle, at any danger level, it is possible to cause specific vehicle 20 to drive along a scheduled route that has been changed.

The following describes a determination on the danger level of an unidentified obstacle in the operation of information processing system 300 for implementing the information processing method.

Figure 9:
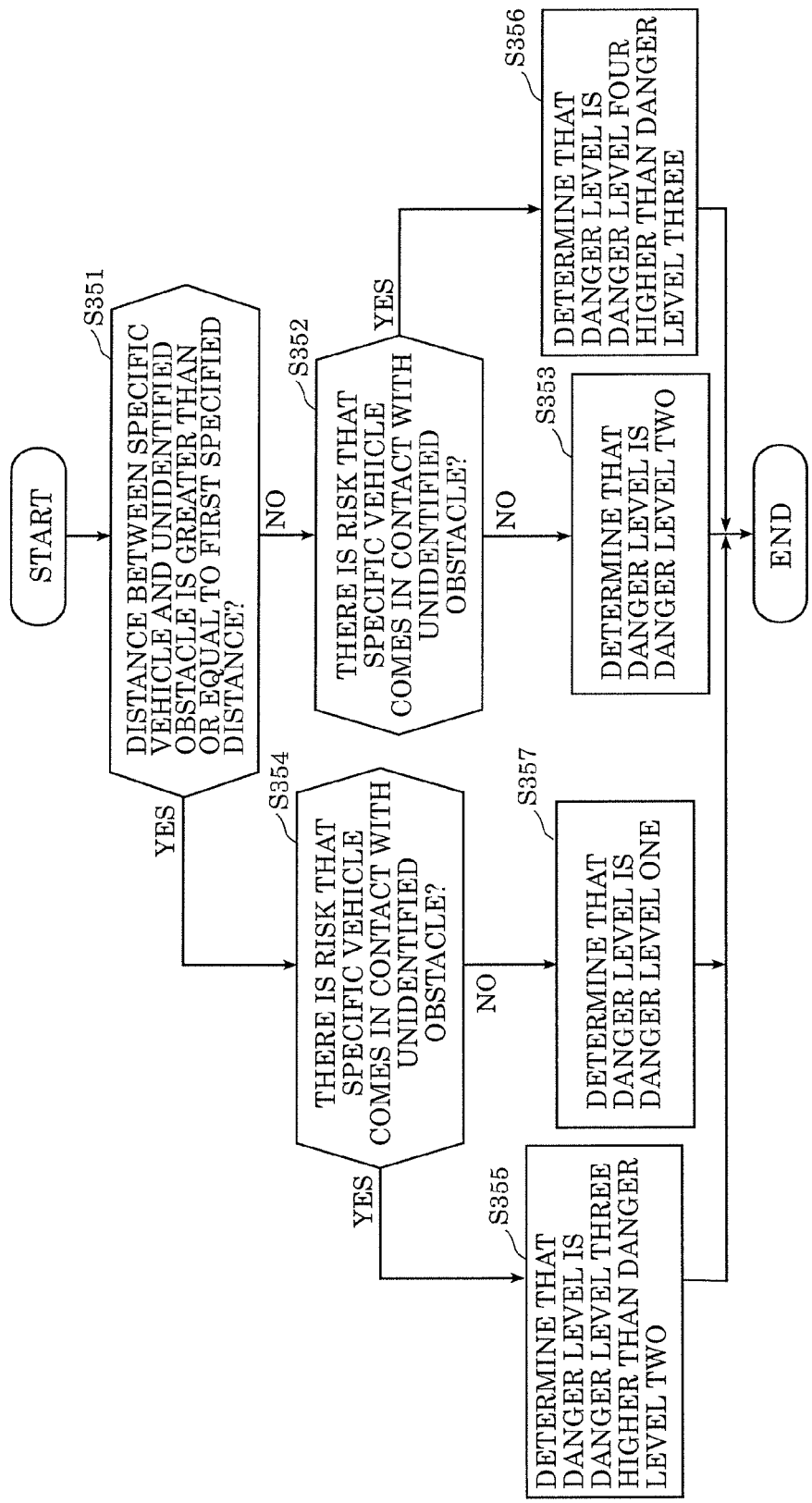
FIG. 9 is a flowchart illustrating an operation of determining a danger level of an unidentified obstacle according to Embodiment 3.

FIG. 9 is a flowchart illustrating an operation of determining the danger level of an unidentified obstacle according to Embodiment 3.

First, second determiner 44 determines whether a distance between specific vehicle 20 and the unidentified obstacle is greater than or equal to a first specified distance (S351), as illustrated in FIG. 9.

When the distance between specific vehicle 20 and the unidentified obstacle is not greater than or equal to the first specified distance (No in S351), that is, when specific vehicle 20 is located within a short distance from the unidentified obstacle, second determiner 44 determines whether there is a risk that specific vehicle 20 comes in contact with the unidentified obstacle (S352).

When specific vehicle 20 does not come in contact with the unidentified obstacle (No in S352), that is, when specific vehicle 20 is located within a short distance from the unidentified obstacle but it is predicted that specific vehicle 20 is unlikely to come in contact with the unidentified obstacle even if specific vehicle 20 drives along a scheduled route, second determiner 44 determines that the danger level of the unidentified obstacle is the danger level two (S353). Second determiner 44 then ends the process.

When the danger level of the unidentified obstacle is the danger level two, moving body controller 23 controls the headlights, horn, etc. of specific vehicle 20 to notify the unidentified obstacle of the presence of specific vehicle 20. Alternatively, a danger notifier to be described later may notify specific vehicle 20 and the unidentified obstacle that specific vehicle 20 and the unidentified obstacle are approaching each other.

When the distance between specific vehicle 20 and the unidentified obstacle is greater than or equal to the first specified distance (Yes in S351), that is, when specific vehicle 20 is located at a long distance from the unidentified obstacle, second determiner 44 determines whether there is a risk that specific vehicle 20 comes in contact with the unidentified obstacle (S354).

When specific vehicle 20 does not come in contact with the unidentified obstacle (No in S354), that is, when specific vehicle 20 is located at a long distance from the unidentified obstacle and specific vehicle 20 is unlikely to come in contact with the unidentified obstacle even if specific vehicle 20 drives along a scheduled route, second determiner 44 determines that the danger level of the unidentified obstacle is the danger level one (S357). Second determiner 44 then ends the process.

When the danger level of the unidentified obstacle is the danger level one, moving body controller 23 controls the headlights, horn, etc. of specific vehicle 20 to notify the unidentified obstacle of the presence of specific vehicle 20.

When there is a risk that specific vehicle 20 comes in contact with the unidentified obstacle (Yes in S354), that is, when specific vehicle 20 is located within a short distance from the unidentified obstacle and it is predicted that there is a risk that specific vehicle 20 comes in contact with the unidentified obstacle if specific vehicle 20 drives along a scheduled route, second determiner 44 determines that the danger level of the unidentified obstacle is the danger level three (S355). Second determiner 44 then ends the process.

When the danger level of the unidentified obstacle is the danger level three, moving body controller 23 controls the brakes, accelerator, etc. of specific vehicle 20 to cause specific vehicle 20 to reduce its speed or controls the headlights, horn, etc. of specific vehicle 20 to notify the unidentified obstacle of the presence of specific vehicle 20.

When there is a risk that specific vehicle 20 comes in contact with the unidentified obstacle (Yes in S352), that is, when specific vehicle 20 is located within a short distance from the unidentified obstacle and it is predicted that there is a risk that specific vehicle 20 comes in contact with the unidentified obstacle if specific vehicle 20 drives along a scheduled route, second determiner 44 determines that the danger level of the unidentified obstacle is the danger level four (S356). Second determiner 44 then ends the process.

When the danger level of the unidentified obstacle is the danger level four, moving body controller 23 controls the brakes, accelerator, etc. of specific vehicle 20 to cause specific vehicle 20 to reduce its speed or stop, or controls, in combination with the control on the brakes and accelerator, the headlights, horn, etc. of specific vehicle 20 to notify the unidentified obstacle of the presence of specific vehicle 20.

Advantageous Effects Etc.

The following describes the advantageous effects of information processing system 300 and the information processing method according to the present embodiment.

As described above, second determiner 44 determines the danger level of an unidentified obstacle based on the route of the unidentified obstacle, which has been predicted by route predictor 43. First communicator 42 outputs information indicating the danger level determined by second determiner 44 to moving body controller 23.

Thus, with information processing system 300, it is possible to accurately predict the danger level of an unidentified obstacle. Moreover, with information processing system 300, it is possible to determine in stages the danger level of an unidentified obstacle depending on the conditions of specific vehicle 20 and the unidentified obstacle. By thus accurately predicting the danger level of an unidentified obstacle, specific vehicle 20 is capable of driving in accordance with the danger level of the unidentified obstacle. This enables specific vehicle 20 to ensure safety.

Other advantageous effects produced by the information processing system and the information processing method according to the present embodiment are identical to those achieved by the information processing system and the information processing method according to Embodiment 1, for instance.

Embodiment 4

[Configuration]

Some of the elements according to this embodiment are identical to those illustrated in Embodiment 1, 2, or 3 unless stated otherwise, and the identical elements are assigned with like reference signs and the detailed description related to the elements is omitted.

Figure 10:
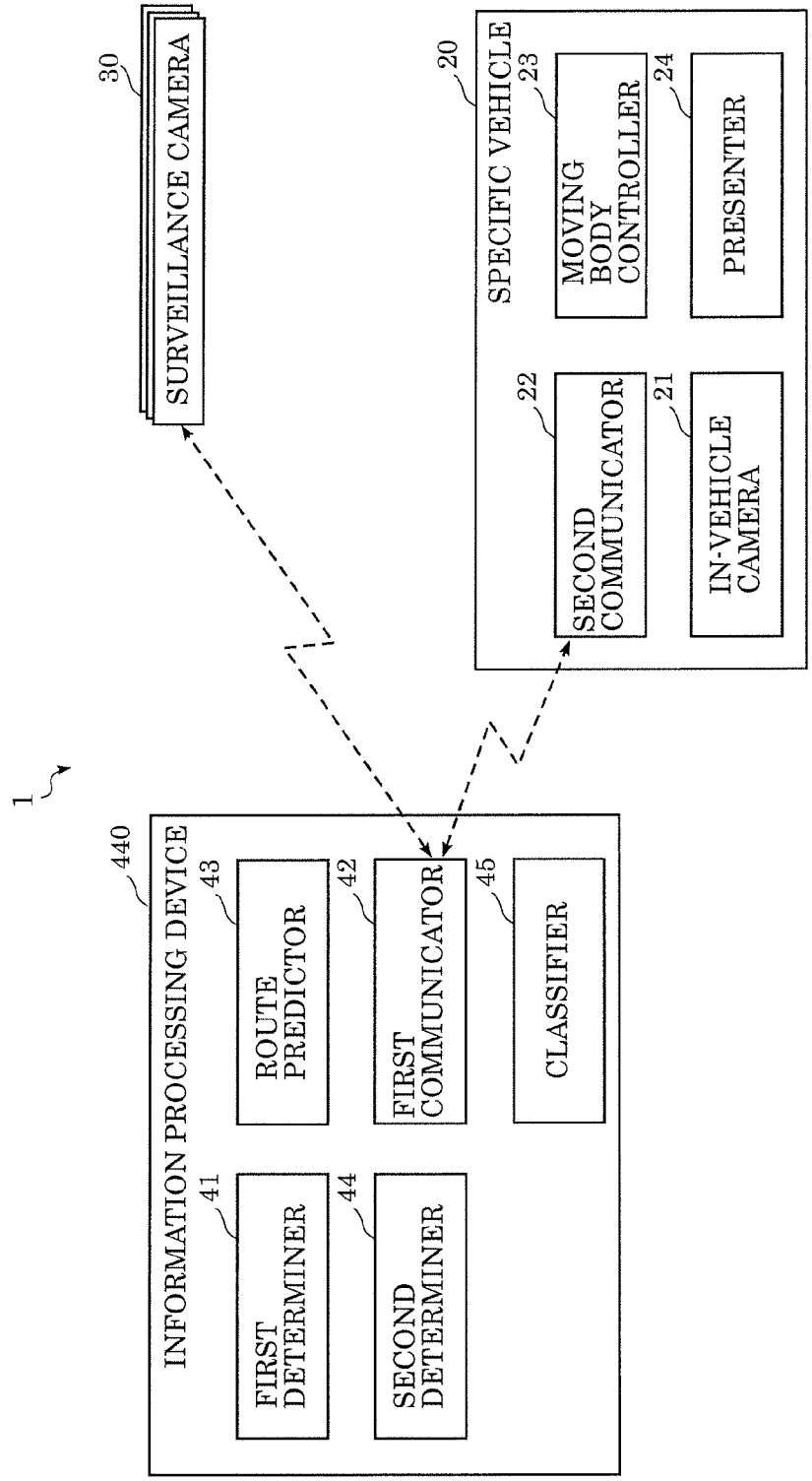
FIG. 10 is a block diagram illustrating an information processing system according to Embodiment 4.

FIG. 10 is a block diagram illustrating information processing system 400 according to Embodiment 4.

Information processing device 440 further includes classifier 45, as illustrated in FIG. 10.

Classifier 45 classifies first obstacles indicated in the first information into either moving obstacles or stationary obstacles. Specifically, classifier 45 classifies each of the first obstacles as either a moving obstacle such as a person, a vehicle, or a flying object, or a stationary obstacle such as a vehicle that is stopped. Classifier 45 classifies the first obstacles based on, for example, map information and information indicating at least one image captured by surveillance camera 30 or in-vehicle camera 21, for instance. Classifier 45 may further classify each of the moving obstacles into smaller groups depending on a type of the moving obstacle, such as a person or a vehicle.

Route predictor 43 defines, as a classified unidentified obstacle, a moving obstacle that has been classified (hereinafter, a classified unidentified obstacle means a moving obstacle that has been classified) and predicts a route of the classified unidentified obstacle based on the first information. Since a moving obstacle, as compared to a stationary obstacle, has a higher risk of coming in contact with specific vehicle 20, that is, there is a risk of contact between specific vehicle 20 and a classified unidentified obstacle, route predictor 43 predicts a route of the classified unidentified obstacle.

[Operation]

The following describes an operation of information processing system 400 for implementing an information processing method according to this embodiment.

Figure 11:
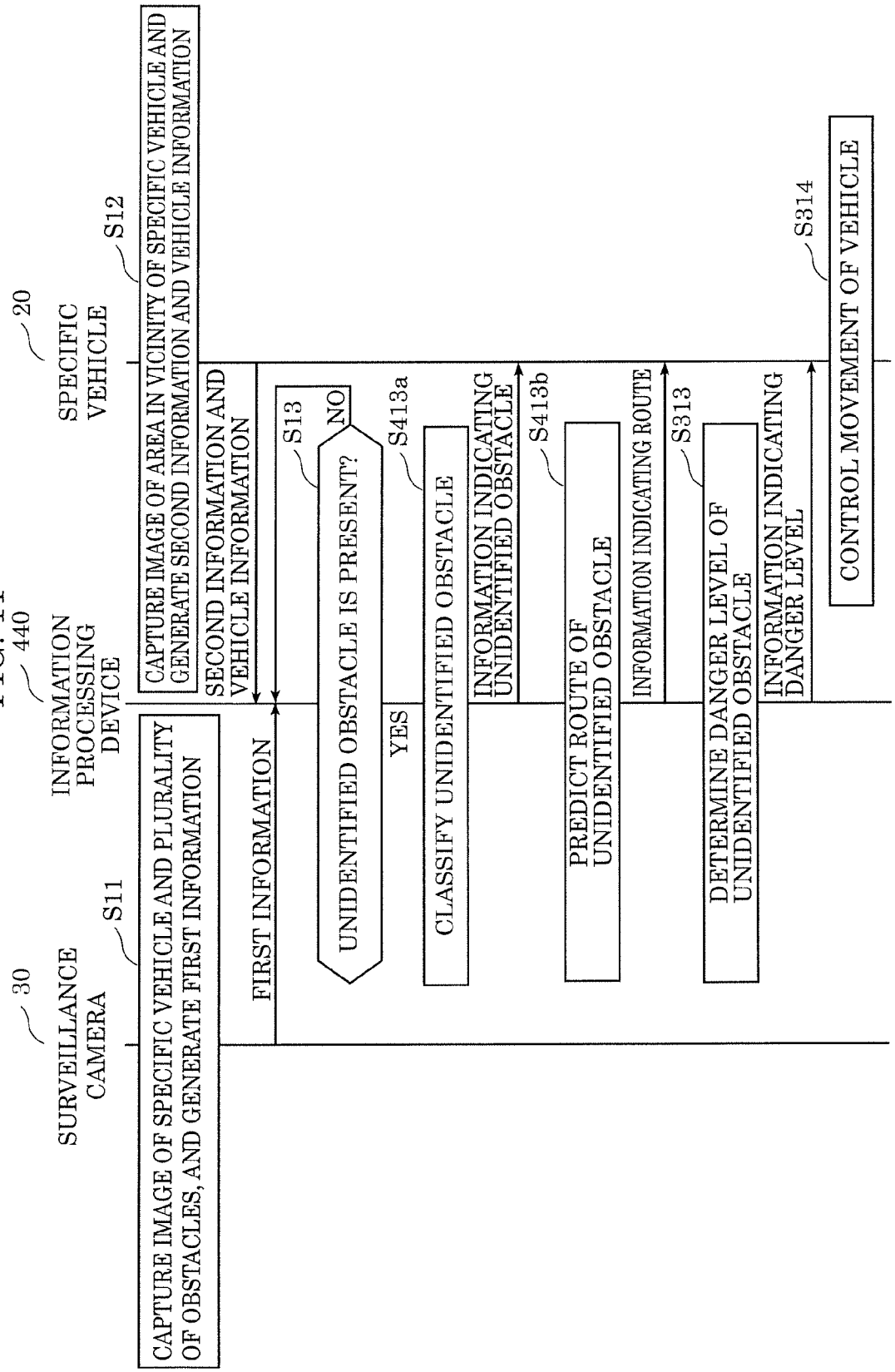
FIG. 11 is a sequence diagram illustrating an operation of the information processing system according to Embodiment 4.

FIG. 11 is a sequence diagram illustrating the operation of information processing system 400 according to Embodiment 4.

Regarding the operation of information processing system 400 for implementing the information processing method according to this embodiment, the description of an operation that is identical to that illustrated in FIG. 4 is omitted accordingly.

First, surveillance camera 30 captures an image of specific vehicle 20 and a plurality of obstacles in the vicinity of specific vehicle 20, and generates first information (S11), as illustrated in FIG. 11. Surveillance camera 30 transmits the first information to information processing device 440.

In-vehicle camera 21 in specific vehicle 20 captures an image of an area in the vicinity of specific vehicle 20 (S12). Specific vehicle 20 transmits the second information and the vehicle information to information processing device 440.

Information processing device 440 determines whether a classified unidentified obstacle, which is not visible from specific vehicle 20 among obstacles each being hidden behind other obstacle when viewed from specific vehicle 20, is present based on the first information, the vehicle information, and map information (S13). When Yes at step S13, classifier 45 determines whether the classified unidentified obstacle is a moving obstacle such as a person, a vehicle, or a flying object, or is a stationary obstacle such as a vehicle that is stopped (S413a). When No at step S13, first determiner 41 returns to step S13 and waits until another first information and vehicle information are received.

First determiner 41 transmits information indicating the classified unidentified obstacle that has been classified by classifier 45 to specific vehicle 20, and proceeds to step S413b.

Route predictor 43 defines a moving obstacle that has been classified as a classified unidentified obstacle and predicts a route of the classified unidentified obstacle, based on the first information (413b). Route predictor 43 transmits information indicating the predicted route of the classified unidentified obstacle to specific vehicle 20.

Second determiner 44 in information processing device 440 determines the danger level of the classified unidentified obstacle based on the route of the classified unidentified obstacle, which has been predicted by route predictor 43 (S313). In this embodiment, second determiner 44 determines the danger level of the classified unidentified obstacle to be any of the danger levels one through four. Second determiner 44 outputs information indicating the determined danger level of the classified unidentified obstacle to moving body controller 23.

Moving body controller 23 in specific vehicle 20 obtains the information indicating the classified unidentified obstacle and the information indicating the predicted route of the classified unidentified obstacle, and controls the driving of specific vehicle 20 based on such information (S314). Presenter 24 outputs the information indicating the classified unidentified obstacle, the information indicating the predicted route of the classified unidentified obstacle, and the information indicating the danger level of the classified unidentified obstacle.

Advantageous Effects Etc.

The following describes the advantageous effects of information processing system 400 and the information processing method according to the present embodiment.

In information processing system 400 and the information processing method, classifier 45 classifies each of one or more first obstacles indicated in the first information as either a moving obstacle that moves or a stationary obstacle that stays in a predetermined location. Route predictor 43 defines a moving obstacle that has been classified as a classified unidentified obstacle and predicts a route of the classified unidentified obstacle, based on the first information.

Thus, with information processing system 400, it is possible to classify each of the first obstacles indicated in the first information as a moving obstacle or a stationary obstacle. This enables accurate prediction of the route of a classified unidentified obstacle. Moreover, it is possible to more correctly predict the danger level of the classified unidentified obstacle. Therefore, specific vehicle 20 is capable of ensuring safety and moving smoothly by driving in accordance with the danger level.

Other advantageous effects produced by the information processing system and the information processing method according to the present embodiment are identical to those achieved by the information processing system for implementing and the information processing method according to Embodiment 1, for instance.

Embodiment 5

[Configuration]

Some of the elements according to this embodiment are identical to those illustrated in Embodiment 1 unless stated otherwise, and the identical elements are assigned with like reference signs and the detailed description related to the elements is omitted.

Figure 12:
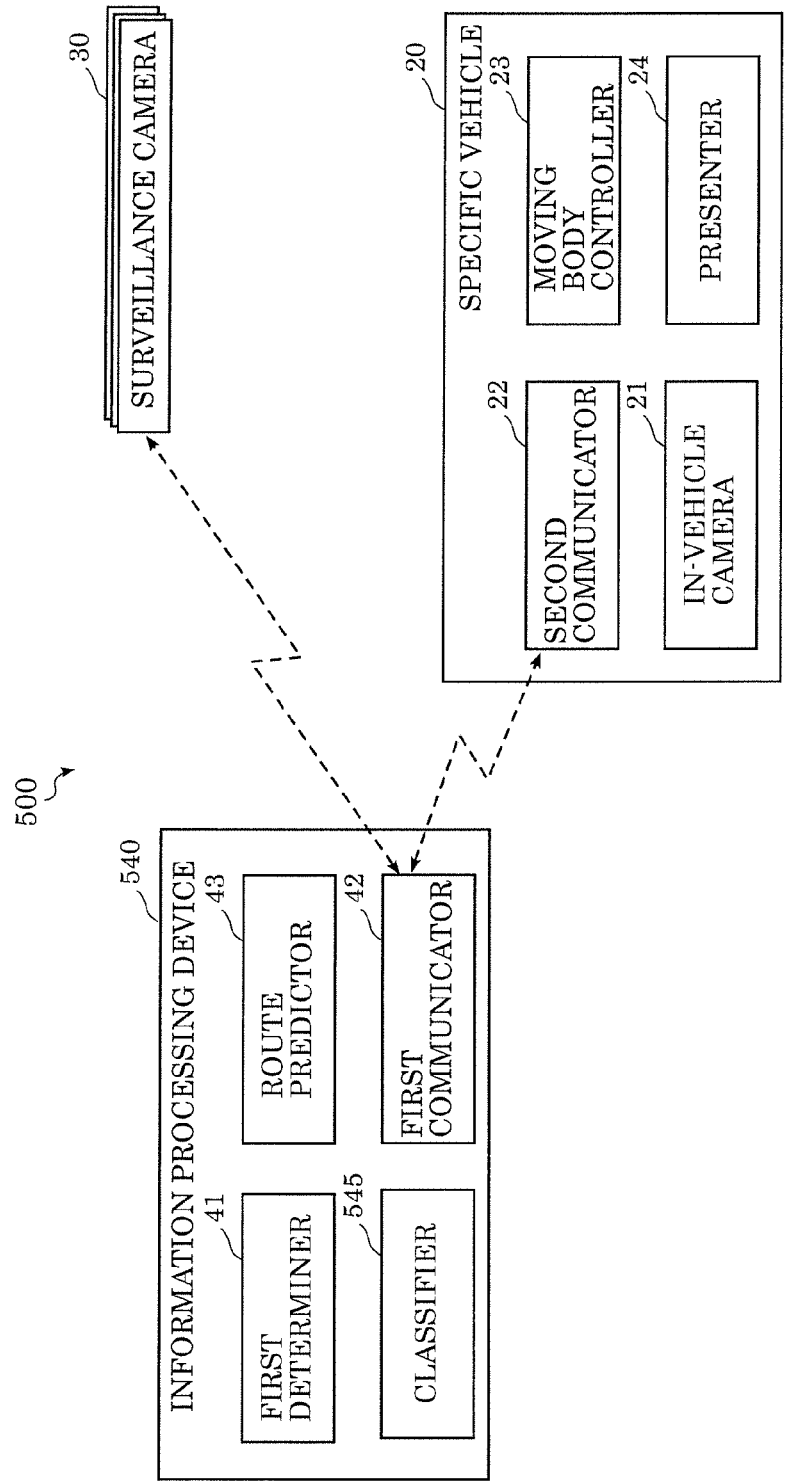
FIG. 12 is a block diagram illustrating an information processing system according to Embodiment 5.

FIG. 12 is a block diagram illustrating information processing system 500 according to Embodiment 5.

Information processing device 540 further includes classifier 545, as illustrated in FIG. 12.

Classifier 545 specifies a type of each of the first obstacles indicated in the first information and classifies each of the first obstacles according to the type of the first obstacle. Specifically, classifier 545 classifies each of the first obstacles as a person, a vehicle, a bicycle, or a flying object which is one of the types to which one or more moving obstacles among the first obstacles belong. Classifier 545 also classifies each of the stationary obstacles among the first obstacles as an obstacle that stays rooted in the ground, such as a building structure, a tree, or an obstacle that temporarily stays in a predetermined location such as a vehicle that is stopped.

When an obstacle other than one or more first obstacles indicated in the first information or an obstacle indicated by map information is present between specific vehicle 20 and one of one or more first obstacles, first determiner 41 determines that that first obstacle is an unidentified obstacle based on the type of the first obstacle, which is one of the types according to which one or more first obstacles have been classified by classifier 545.

In other words, first determiner 41 determines, for each of one or more first obstacles, whether the first obstacle is an unidentified obstacle based on the type of the first obstacle, which is one of the types according to which one or more first obstacles have been classified.

Classifier 545 according to this present embodiment may be included in the information processing system according to the aforementioned Embodiment 2, 3, or 4.

[Operation]

The following describes an operation of information processing system 500 for implementing an information processing method according to this embodiment.

Figure 13:
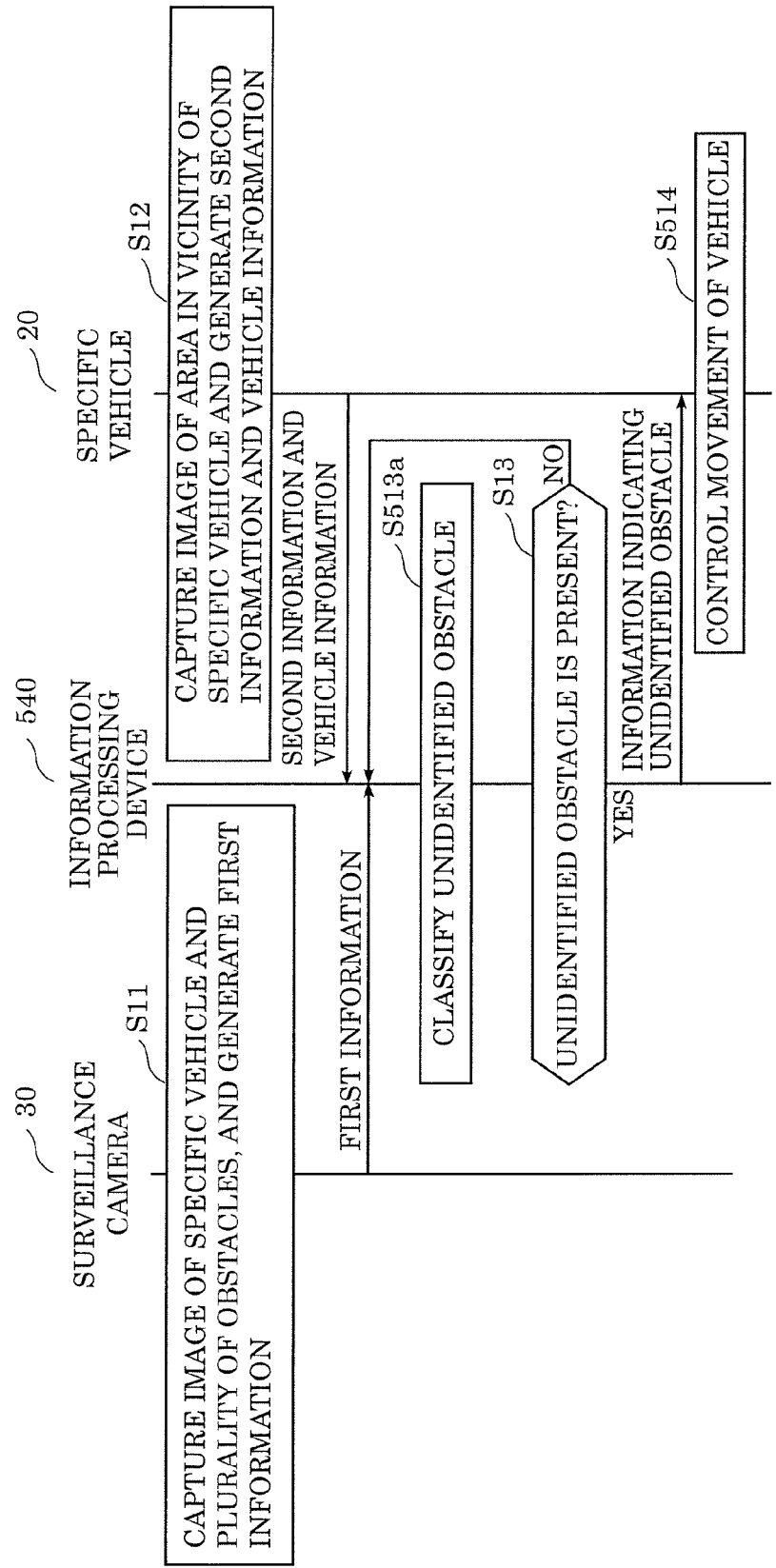
FIG. 13 is a sequence diagram illustrating an operation of the information processing system according to Embodiment 5.

FIG. 13 is a sequence diagram illustrating the operation of information processing system 500 according to Embodiment 5.

First, surveillance camera 30 captures an image of specific vehicle 20 and a plurality of obstacles in the vicinity of specific vehicle 20, and generates first information (S11), as illustrated in FIG. 13. Surveillance camera 30 transmits the first information to information processing device 540.

In-vehicle camera 21 in specific vehicle 20 captures an image of an area in the vicinity of specific vehicle 20 (S12).

Specific vehicle 20 transmits the second information and the vehicle information to information processing device 540.

Classifier 545 specifies the type of each of one or more first obstacles indicated in the first information based on the first information and map information, and classifies an unidentified obstacle as one of the types classified by classifier 545 (S513a).

When the type of a moving obstacle is a bicycle or a pedestrian, for example, and if the bicycle is present between specific vehicle 20 and the pedestrian, the pedestrian hidden behind the bicycle is not visible from specific vehicle 20. Accordingly, first determiner 41 determines that an unidentified obstacle is present (Yes in S13).

In contrast, when the type of a moving obstacle is a vehicle or a pedestrian and if the pedestrian is present between specific vehicle 20 and the vehicle, the vehicle behind the pedestrian is visible from specific vehicle 20. Accordingly, first determiner 41 determines that an unidentified obstacle is not present (No in S13).

In other words, when a first obstacle is small such as a pedestrian, the pedestrian (first obstacle) is not visible due to a vehicle which is an obstacle between specific vehicle 20 and the first obstacle, but when the first obstacle is large such as a vehicle, the vehicle (first obstacle) is visible even though a pedestrian is present as an obstacle between specific vehicle 20 and the first obstacle. Since classifier 545 thus classifies each of the first obstacles according to the type of the first obstacle, first determiner 41 is capable of determining whether an obstacle between specific vehicle 20 and the first obstacle is an unidentified obstacle.

First determiner 41 then returns the process to step S513a.

When Yes at step S13, first determiner 41 transmits information indicating the unidentified obstacle to specific vehicle 20.

Upon obtaining the information indicating the unidentified obstacle, moving body controller 23 in specific vehicle 20 controls the driving of specific vehicle 20 based on the information obtained (S514).

Advantageous Effects Etc.

The following describes the advantageous effects of information processing system 500 and the information processing method according to the present embodiment.

Information processing system 500 further includes classifier 545 that classifies each of one or more first obstacles among a plurality of obstacles, according to the type of the first obstacle. When an obstacle other than one or more first obstacles indicated in the first information or an obstacle indicated by map information is present between specific vehicle 20 and one of one or more first obstacles, first determiner 41 determines that that first obstacle is an unidentified obstacle based on the type of the first obstacle, which is one of the types according to which one or more first obstacles have been classified by classifier 545.

First determiner 41 thus determines whether an unidentified obstacle is present based on the type of a first obstacle, which is one of the types according to which classifier 545 has classified one or more first obstacles. This enables easy determination on the presence of an unidentified obstacle.

Other advantageous effects produced by the information processing system and implementing the information processing method according to the present embodiment are identical to those achieved by the information processing system and the information processing method according to Embodiment 1, for instance.

OTHER EMBODIMENTS

Although the present disclosure has been described based on Embodiments 1 through 5, the present disclosure should not be limited to each of the above-described information processing systems and the information processing methods.

In the information processing system and the information processing method according to each of the aforementioned Embodiments 1 through 5, a first determiner and a second determiner are both included in an information processing device, but at least one of these determiners may be included in a specific vehicle.

When the first determiner is included in the information processing device and the second determiner is included in the specific vehicle, for example, there is no need for the information processing device to manage the scheduled route of the specific vehicle, and this can reduce an increase in the processing load of the information processing device. With this, it is possible to reduce an increase in the amount of data for communications between the specific vehicle and the information processing device.

When both of the first determiner and the second determiner are included in the specific vehicle, there is no need for the information processing device to determine whether an unidentified obstacle is present, and this can further reduce an increase in the processing load of the information processing device. With this, there is no need for the specific vehicle to transmit the second information to the information processing device, and this can further reduce an increase in the amount of data for communications between the specific vehicle and the information processing device.

A moving body controller is included in the specific vehicle, but may be included in the information processing device. This enables the information processing device to control the specific vehicle and is useful in the case where plural specific vehicles are present.

An image of a specific vehicle and first obstacles in the vicinity of the specific vehicle may be captured using, instead of surveillance camera 30, an in-vehicle camera mounted on a vehicle other than the specific vehicle. In this case, all of the first determiner, the second determiner, and the vehicle controller may be included in the specific vehicle. In this case, the information processing device is mounted on the specific vehicle, and the specific vehicle and the information processing device do not need to perform wireless communications.

In this way, the first determiner, the second determiner, and the vehicle controller may be selectively included either in the specific vehicle or the information processing device.

In the information processing system or information processing method according to each of the aforementioned Embodiments 1 through 5, an actual route taken by an unidentified obstacle may be stored as a history of actual routes in a storage device, for instance. The information processing device or the information processing system may include, for instance, such a storage device. In this case, a route predictor may predict the route of an unidentified obstacle based on the history of actual routes taken by the unidentified obstacle as well as the moving speed, moving direction, location, size, etc. of the unidentified obstacle. Since pedestrians frequently walked across a road at a predetermined site in the past, the route predictor may predict, based on map information, the route of a pedestrian (i.e., an obstacle that can be an unidentified obstacle) under the assumption that the pedestrian may be present at the predetermined site. The route predictor thus predicting the route of an unidentified obstacle enables the specific vehicle to drive smoothly.

Figure 14:
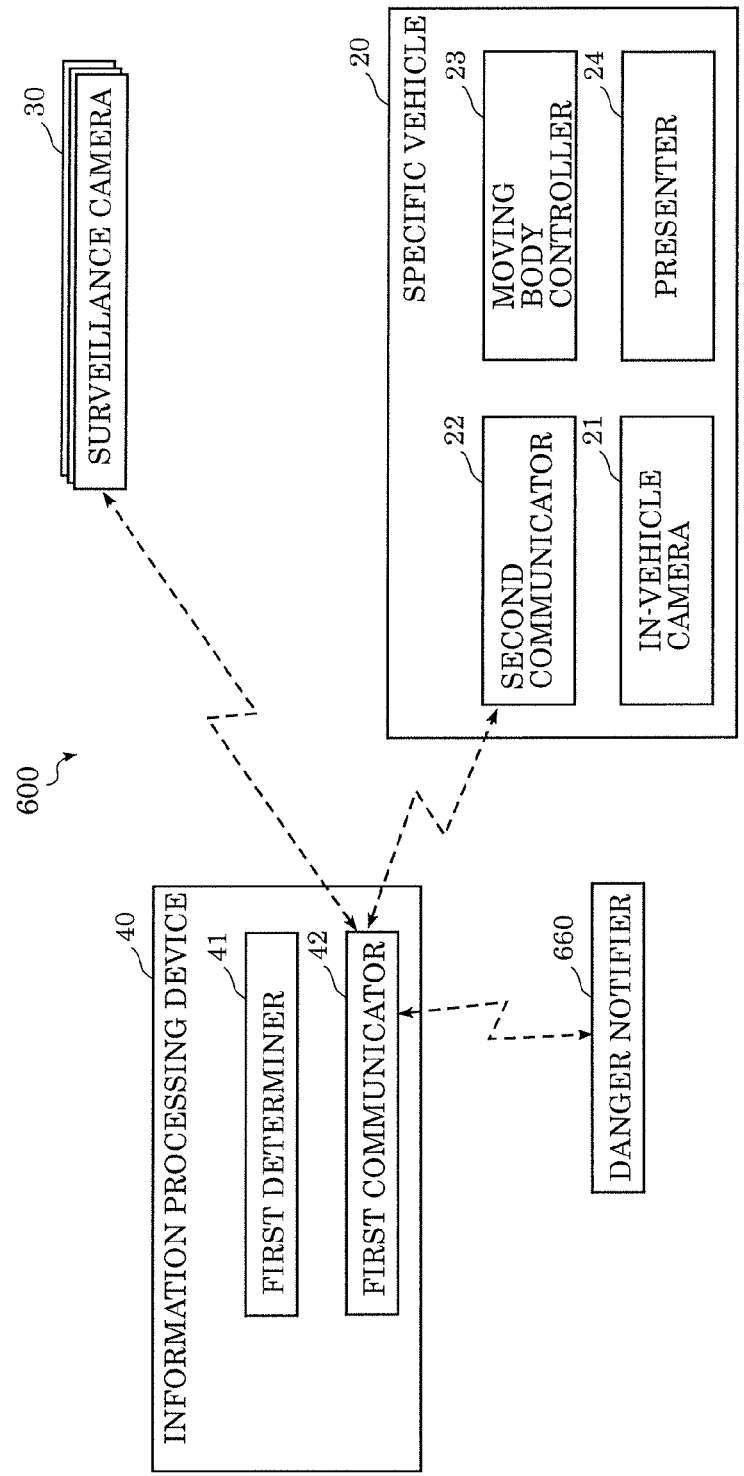
FIG. 14 is a schematic diagram illustrating an information processing system according to a variation.

Information processing system 600 according to each of the aforementioned Embodiments 1 through 5 further includes danger notifier 660, as illustrated in FIG. 14. FIG. 14 is a schematic diagram illustrating information processing system 600 according to a variation of each of the aforementioned Embodiments 1 through 5. Danger notifier 660 at least notifies an unidentified obstacle that specific vehicle 20 is approaching the unidentified obstacle or notifies specific vehicle 20 that an unidentified obstacle is approaching specific vehicle 20. Danger notifier 660 is, for example, a loudspeaker, a lighting device, etc. provided in an unidentified obstacle or specific vehicle 20. Information processing device 40 may transmit a command to danger notifier 660 to cause danger notifier 660 to notify an unidentified obstacle of specific vehicle 20 closing in on the unidentified obstacle. Alternatively, information processing device 40 may transmit a command to danger notifier 660 to cause danger notifier 660 to notify specific vehicle 20 of an unidentified obstacle closing in on specific vehicle 20.

The present disclosure may be realized as a program for causing a computer to execute the information processing method according to each of the aforementioned Embodiments 1 through 5.

A program for realizing the information processing system and the information processing method according to each of the aforementioned Embodiments 1 through 5 can be typically realized as an LSI which is an integrated circuit. These circuits may be individually realized as one chip or may be realized as one chip including part or all of the circuits.

Each of the processing units to be realized as an integrated circuit is not limited to an LSI and may be realized as a dedicated circuit or a general-purpose processor. A field programmable gate array (FPGA) which can be programmed after an LSI is manufactured or a reconfigurable processor which can reconfigure connection or setting of circuit cells inside an LSI may be used.

It should be noted that each of the elements included in the identification system and the identification device according to the aforementioned one or more aspects may be configured by dedicated hardware or may be realized by executing a software program suitable for each element. Each element may be implemented by a program executor such as a CPU or a processor reading and executing a software program recorded on a recording medium such as a hard disc or a semiconductor memory.

All the numbers used above are exemplary numbers to specifically describe the present disclosure, and the present disclosure is not limited to the illustrated numbers.

Division of a functional block in each block diagram is an example, and plural functional blocks may be realized as one functional block, one functional block may be divided into plural functional blocks, or part of functions may be transferred to another functional block. Besides, single hardware or software may process, in parallel or by way of time division, functions of plural functional blocks having similar functions.

An order to execute each step in the flowchart is an exemplary order for specifically describing the present disclosure, and may be other than the above-described order. Furthermore, part of the above-described steps may be executed at the same time as (in parallel to) the execution of other steps.

Forms obtained by various modifications to the foregoing embodiments that can be conceived by a person skilled in the art as well as forms realized by arbitrarily combining structural components and functions in the embodiments within the scope of the essence of the present disclosure are included in the present disclosure.

While various embodiments have been described herein above, it is to be appreciated that various changes in form and detail may be made without departing from the spirit and scope of the present disclosure as presently or hereafter claimed.

Further Information about Technical Background to this Application

The disclosures of the following Japanese Patent Applications including specification, drawings and claims are incorporated herein by reference in their entirety: PCT International Application No. PCT/JP2019/037394 filed on Sep. 24, 2019; and Japanese Patent Application No. 2018-184123 filed on Sep. 28, 2018.

INDUSTRIAL APPLICABILITY

The present disclosure can be utilized for systems for enhancing safety in a system for assisting the driving of a moving body.

What is claimed is:

1. An information processing system, comprising:
a camera that captures an image of a moving body and a vicinity of the moving body and detects a plurality of obstacles in the vicinity of the moving body based on the captured image;
a processor that determines whether an unidentified obstacle is present based on first information regarding the plurality of obstacles detected by the camera and moving body information indicating the moving body, the unidentified obstacle being included in the plurality of obstacles and not visible from the moving body;
a communicator that outputs information indicating the unidentified obstacle to the moving body when the processor determines that the unidentified obstacle is present; and
a moving body controller that controls a movement of the moving body based on the information indicating the unidentified obstacle,
wherein the processor determines that a first obstacle of the plurality of obstacles detected by the camera is the unidentified obstacle, when an obstacle of the plurality of obstacles other than the first obstacle is present between the moving body and the first obstacle, and
the processor determines that the first obstacle is the unidentified obstacle based on the moving body information, the first information and map information indicating a map of the vicinity of the moving body, when an obstacle indicated by the map information is present between the moving body and the first obstacle.

2. The information processing system according to claim 1, wherein:
the processor classifies the first obstacle according to a type of the first obstacle, and
processor determines that the first obstacle is the unidentified obstacle further based on the classified type of the first obstacle.

3. The information processing system according to claim 1, wherein
the moving body detects one or more second obstacles that are visible from the moving body, and transmits second information regarding the one or more second obstacles detected to the information processing system, and
when further determining that one of the one or more second obstacles indicated in the second information transmitted is identical to the first obstacle, the processor determines that the first obstacle to which the one of the one or more second obstacles is determined to be identical is not the unidentified obstacle.

4. The information processing system according to claim 1, wherein
the first information includes at least one of a moving speed, a moving direction, or a location of at least one of the plurality of obstacles detected by the camera.

5. The information processing system according to claim 1, wherein:
the processor further that predicts a route of the unidentified obstacle based on the first information, and
the moving body controller controls the movement of the moving body based on the route predicted.

6. The information processing system according to claim 5, wherein:
the processor further determines a danger level of the unidentified obstacle based on the predicted route of the unidentified obstacle or the first information, and
the moving body controller controls the movement of the moving body based on information indicating the danger level determined.

7. The information processing system according to claim 6, wherein
the moving body information includes at least one of a moving speed, a location, or a scheduled route of the moving body, and
the processor determines the danger level of the unidentified obstacle based on a result obtained by determining whether the moving body comes in contact with the unidentified obstacle based on the first information and the moving body information.

8. The information processing system according to claim 7, wherein the processor:
determines that the danger level is danger level one when a distance between the moving body and the unidentified obstacle is greater than or equal to a first specified distance and the moving body does not come in contact with the unidentified obstacle;
determines that the danger level is danger level two higher than the danger level one when the distance between the moving body and the unidentified obstacle is less than the first specified distance and the moving body does not come in contact with the unidentified obstacle;
determines that the danger level is danger level three higher than the danger level two when the distance between the moving body and the unidentified obstacle is greater than or equal to the first specified distance and there is a risk that the moving body comes in contact with the unidentified obstacle; and
determines that the danger level is danger level four higher than the danger level three when the distance between the moving body and the unidentified obstacle is less than the first specified distance and there is a risk that the moving body comes in contact with the unidentified obstacle.

9. The information processing system according to claim 5, wherein:
the processor classifies the first obstacle as a moving obstacle that moves or a stationary obstacle that stays in a predetermined location, and
based on the first information, the processor defines the moving obstacle as a classified unidentified obstacle and predicts a route of the classified unidentified obstacle.

10. The information processing system according to claim 1, wherein:
the processor at least notifies the unidentified obstacle that the moving body is approaching the unidentified obstacle or notifies the moving body that the unidentified obstacle is approaching the moving body.

11. The information processing system according to claim 1, wherein the map information includes an internal structure of a parking facility.

12. The information processing system according to claim 10, wherein
the processor causes a speaker or a lighting device provided in the unidentified obstacle to notify the unidentified obstacle that the moving body is approaching the unidentified obstacle or causes a speaker or a lighting device provided in the moving body to notify the moving body that the unidentified obstacle is approaching the moving body.

13. An information processing method, comprising:
capturing an image of a moving body and a vicinity of the moving body and detecting a plurality of obstacles in the vicinity of the moving body based on the captured image;
determining whether an unidentified obstacle is present based on first information regarding the plurality of obstacles detected and moving body information indicating the moving body, the unidentified obstacle being included in the plurality of obstacles and not visible from the moving body;
outputting information indicating the unidentified obstacle to the moving body when it is determined that the unidentified obstacle is present; and
controlling a movement of the moving body based on the information indicating the unidentified obstacle,
wherein a first obstacle of the plurality of obstacles detected is determined as the unidentified obstacle, when an obstacle of the plurality of obstacles other than the first obstacle is present between the moving body and the first obstacle, and
the first obstacle is determined as the unidentified obstacle based on the moving body information, the first information and map information indicating a map of the vicinity of the moving body, when an obstacle indicated by the map information is present between the moving body and the first obstacle.

14. An information processing system, comprising:
a camera that captures an image of a moving body and a vicinity of the moving body and detects a plurality of obstacles in the vicinity of the moving body based on the captured image;
a processor that determines whether an unidentified obstacle is present based on first information regarding the plurality of obstacles detected by the camera and moving body information indicating the moving body, the unidentified obstacle being included in the plurality of obstacles and not visible from the moving body;

a communicator that outputs information indicating the unidentified obstacle to the moving body when the processor determines that the unidentified obstacle is present; and a moving body controller that controls a movement of the moving body based on the information indicating the unidentified obstacle, wherein the first information includes at least one of a moving speed, a moving direction, or a location of at least one of the plurality of obstacles detected by the camera, the processor further predicts a route of the unidentified obstacle based on the first information, the moving body controller controls the movement of the moving body based on the route predicted, the processor further determines a danger level of the unidentified obstacle based on the predicted route of the unidentified obstacle or the first information, the moving body controller controls the movement of the moving body based on information indicating the danger level determined, the moving body information includes at least one of a moving speed, a location, or a scheduled route of the moving body, the processor further determines the danger level of the unidentified obstacle based on a result obtained by determining whether the moving body comes in contact with the unidentified obstacle based on the first information and the moving body information, and the processor:

determines that the danger level is danger level one when a distance between the moving body and the unidentified obstacle is greater than or equal to a first specified distance and the moving body does not come in contact with the unidentified obstacle;

determines that the danger level is danger level two higher than the danger level one when the distance between the moving body and the unidentified obstacle is less than the first specified distance and the moving body does not come in contact with the unidentified obstacle;

determines that the danger level is danger level three higher than the danger level two when the distance between the moving body and the unidentified obstacle is greater than or equal to the first specified distance and there is a risk that the moving body comes in contact with the unidentified obstacle; and determines that the danger level is danger level four higher than the danger level three when the distance between the moving body and the unidentified obstacle is less than the first specified distance and there is a risk that the moving body comes in contact with the unidentified obstacle.

* * * * *